(12) United States Patent
Allen et al.

(10) Patent No.: US 8,655,824 B1
(45) Date of Patent: Feb. 18, 2014

(54) GLOBAL POLICY FRAMEWORK ANALYZER

(75) Inventors: Paul L. Allen, Redmond, WA (US);
David J. Finton, Issaquah, WA (US);
Charles Theodore Kitzmiller, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 519 days.

(21) Appl. No.: 13/041,545

(22) Filed: Mar. 7, 2011

(51) Int. Cl.
*G06N 5/02* (2006.01)

(52) U.S. Cl.
USPC .......................................................... 706/47

(58) Field of Classification Search
USPC ............................................................ 706/47
See application file for complete search history.

(56) References Cited

U.S. PATENT DOCUMENTS

| | | | |
|---|---|---|---|
| 4,417,305 A | 11/1983 | Berstis | |
| 4,722,071 A | 1/1988 | Gates et al. | |
| 5,794,227 A | 8/1998 | Brown | |
| 5,875,445 A | 2/1999 | Antonshenkov | |
| 6,466,932 B1 * | 10/2002 | Dennis et al. | 710/33 |
| 7,480,912 B2 * | 1/2009 | Arnold et al. | 718/104 |
| 7,640,429 B2 | 12/2009 | Huang et al. | |
| 2007/0056018 A1 | 3/2007 | Ridlon et al. | |
| 2007/0056019 A1 | 3/2007 | Allen et al. | |
| 2009/0119746 A1 | 5/2009 | Allen et al. | |
| 2009/0281977 A1 | 11/2009 | Allen et al. | |
| 2010/0063643 A1 * | 3/2010 | Boss et al. | 700/291 |

OTHER PUBLICATIONS

Sirin, "Automated Policy Analysis: HIPAA, XACML, and OWL", Clark & Parsia, pp. 1-2, Dec. 10, 2008, http://weblog.clarkparsia.com/2008/12/10/automated-policy-analysis-hipaa-xacml-and-owl/.
Smith, "XACML-DL: analyzing Web Access Control Policies USing Semantic Technologies" Clark & Parsia, LLC, SemTech 2008, pp. 1-17.
Stocker, "Managing XACML Policies: A DL Perspective", pp. 1-3, Jul. 14, 2008, http://weblog.clarkparsia.com/2008/07/14/managing-xacml-policies-a-dl-perspective/.
Kolovski et al., "Formalizing XACML Using Defeasible Description Logistics", WWW2007, May 8-12, 2007, Banff, Canada, pp. 1-11.
Whang et al., "Indexing Boolean Expressions",ACM, VLDB '09 Aug. 2009 Lyon France, pp. 1-12.
IA Architecture Office (I11), "Global Information Grid Information Assurance Capability/Technology Roadmap", Version 1.0, Oct. 26, 2004, National Security Agency Information Assurance Directorate, pp. 1-6.

(Continued)

*Primary Examiner* — Kakali Chaki
*Assistant Examiner* — Mai T Tran
(74) *Attorney, Agent, or Firm* — Yee & Associates, P.C.

(57) ABSTRACT

Analyzing a set of policies. A goal comprising a particular outcome is received. An analysis object comprising a data structure maintaining information needed to perform an analysis of the goal is defined. The analysis object is configured to limit a number of calculations needed to achieve the goal. Each member of a set of expressions found in the set of policies has an output. The output is the same for each expression. One of the set of expressions is solved. The solved output is cached in the analysis object such that the solved output is associated with each member of the set of expressions. The analysis object is processed to create a set of values that achieves the goal. Processing includes referencing the cache to retrieve the solved output each time a member of the set of expressions is to be solved during processing of the analysis object.

20 Claims, 11 Drawing Sheets

(56) References Cited

OTHER PUBLICATIONS

NITRD Request for Input No. 3 (RFI-3)—National Cyber Leap Year, "policy-based Configuration/Implementation—Standards based security policy definitions and enforcement frameworks; architectures and techniques for implementing fine coarse access and permission controls" Networking and Information Rresearch and Development, pp. 1-5, Feb. 25, 2009 www.thefederalregister.com/d.p/2009-03-02-E9-4321.

Forgy, "On the efficient implementation of production systems", Dept. of Computer Science, Carnegie-Mellon University, 1979, pp. 1-144.

Doorenbos, "Production Matching for Large Learning Systems", Jan. 31, 1995, CMU-CS-113, Computer Science Dept., Carnegie Mellon University, Pittsburgh, PA, pp. 1-208.

* cited by examiner

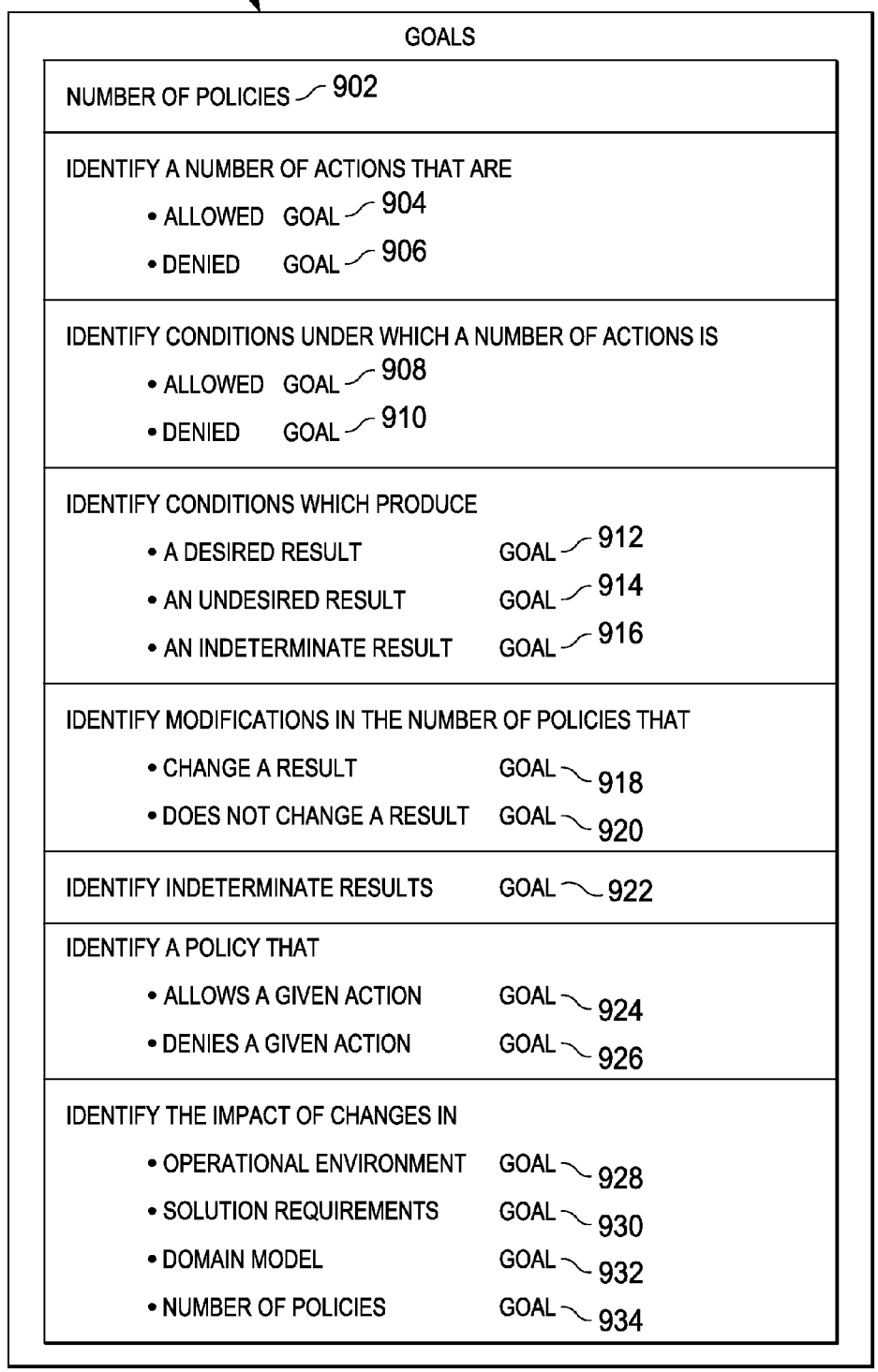

| Rule | ID | IDx | Minterm Expression (conjunction of clauses) | E | N | Neg Op | Action (ID) | Result (PI) | Domain (PI) |
|---|---|---|---|---|---|---|---|---|---|
| R1 | m1 | 1 | Role ⊉ {user} ~1016 | 15 | 0 | 1 | Read (1) | Deny (0) | Core (0) |
| R2 | m5 | 1 | Role ⊇ {user} ~1018 | 4 |  |  |  |  |  |
|  |  | 2 | Subject_Relationship = employee ~1020 | 1 | 3 | 0 | Read (1) | Allow (1) | IP(1) |
|  |  | 3 | Resource_Marking = proprietary} ~1022 | 1 |  |  |  |  |  |
| R5 | m9 | 1 | Subject_Relationship = employee ~1024 | 1 |  |  |  |  |  |
|  |  | 2 | Resource_Marking = confidential ~1026 | 1 | 4 | 0 | Read (1) | Allow (1) | IP(1) |
|  |  | 3 | Subject_AccessGroups ∩ Authorized_AccessGroups | * |  |  |  |  |  |

POLICY INDEX 1000

FIG. 10

| N | Rule ID | ID | IDx | Key-LHS Role / Attribute Name | Key-RHS Attribute Name / Value(s) | Op | Neg Op | E | Result (PI) | Action (ID) | Domain (PI) | Solve | True Result | Cached |
|---|---|---|---|---|---|---|---|---|---|---|---|---|---|---|
| 1 | R1 | m1 | 1 | Role | {user} | ∉ | 1 | 15 | deny (0) | _all | Core (0) | negate | | m1-1 |
| 2 | R4 | m6 | 1 | Subject_Relationship | employee | ≠ | 1 | 4 | deny (0) | read | IP(1) | negate | | m6-1 |
|   | R2 | m2 | 1 | Subject_Relationship | employee | = | 0 | 1 | allow (1) | read | IP(1) | equate | *rhs* | |
| 2 | R4 | m6 | 2 | Resource_Marking | confidential | = | 0 | 1 | deny (0) | read | IP(1) | equate | | |
|   | R2 | m2 | 2 | Resource_Marking | proprietary | = | 0 | 1 | allow (1) | read | IP(1) | equate | *rhs* | |
| 3 | R5 | m7 | 1 | Subject_Relationship | employee | ≠ | 1 | 7 | deny (0) | read | IP(1) | m-negate | | m7-2 |
|   | R5 | m7 | 2 | Subject_Relationship | subcontractor | ≠ | 1 | 7 | deny (0) | read | IP(1) | m-negate | | m7-2 |
| 3 | R5 | m7 | 3 | Resource_Marking | proprietary | = | 0 | 1 | allow (1) | read | IP(1) | equate | *rhs* | |
| 4 | R3 | m5 | 1 | Subject_Relationship | employee | = | 0 | 1 | deny (0) | read | IP(1) | equate | | |
|   | R2 | m3 | 1 | Subject_Relationship | employee | = | 0 | 1 | allow (1) | read | IP(1) | equate | *rhs* | |
|   | R2 | m4 | 1 | Subject_Relationship | employee | = | 0 | 1 | allow (1) | read | IP(1) | equate | | |
| 4 | R3 | m5 | 2 | Resource_Marking | third_party | = | 0 | 1 | deny (0) | read | IP(1) | equate | *rhs* | |
|   | R2 | m3 | 2 | Resource_Marking | confidential | = | 0 | 1 | allow (1) | read | IP(1) | equate | | |
|   | R2 | m4 | 2 | Resource_Marking | third_party | = | 0 | 1 | allow (1) | read | IP(1) | equate | | |
| 4 | R3 | m5 | 3 | Subject_AccessGroups | Authorized_AccessGroups | ∩ | 0 | * | allow (1) | read | IP(1) | intersect | | m3-3 |
| 4 | R3 | m3 | 3 | Subject_Use | Terms_of_Use | ⊄ | 1 | * | deny (0) | read | IP(1) | negate | | m5-1 |
| 4 | R2 | m4 | 3 | Subject_Use | Terms_of_Use | ⊆ | 0 | * | allow (1) | read | IP(1) | RHS-attr | | m4-3 |

1100 REVERSE POLICY INDEX

FIG. 11

GLOBAL POLICY FRAMEWORK ANALYZER

BACKGROUND INFORMATION

1. Field

The present disclosure relates generally to computing and information system policies. More particularly, the present disclosure relates to a global policy analyzer for analyzing a set of policies and informing an authoring process by identifying policy errors and other aspects of the set of policies.

2. Background

Virtually all information and data processing systems are managed and controlled by computing and information system policies. Different types of policies may include, for example, but without limitation, authorization policies, information assurance policies, quality management services (QMS) policies, access control policies, network security policies, and computer use policies.

For example, information assurance policies govern information protection and sharing. Quality management services policies control utilization of data processing system resources. Network management policies govern computing network design, deployment, and administration.

Policies may be extremely complex and include numerous policy rules, policy elements, and attribute configurations. Due to this potential complexity, the author of a policy may inadvertently introduce inconsistencies and errors into the specification of a policy. As used herein, the term "policy specification" refers to a high level design or description of one or more policies. As used herein, the term "policy code" refers to a codification of the policy specification, wherein the code may be stored in a storage medium and is executable by one or more processors.

In addition to the above issues, it may be frequently difficult, time consuming, impractical, or cost prohibitive for a user to diagnose problems in policies, correct errors in policies, and author valid policies. Accordingly, it would be advantageous to have a method and apparatus which takes into account one or more of the issues discussed above, as well as other potential issues not listed above.

SUMMARY

In one advantageous embodiment, a method for analyzing a set of policies is provided. A goal is received at a processor unit. The goal comprises a particular outcome to be achieved within the set of policies. An analysis object comprising a data structure maintaining information necessary to perform an analysis of the goal with respect to the set of policies is defined. The analysis object is configured to limit a number of calculations needed to achieve the goal. A set of expressions in the set of policies is found. Each member of the set of expressions has an output once solved. The output for the each member of the set of expressions is the same. The output for one member of the set of expressions is solved. A solved output is created. The solved output is cached in a cache of the analysis object such that the solved output is associated with the each member of the set of expressions. The analysis object is processed to create a set of values that achieves the goal. Processing includes referencing the cache to retrieve the solved output each time a member of the set of expressions is to be solved during processing of the analysis object.

In another advantageous embodiment a computer program product for analyzing a set of policies is provided. The computer program product includes a computer readable storage medium. The computer program product includes program code, stored on the computer readable storage medium, for receiving a goal comprising a particular outcome to be achieved within the set of policies. The computer program product also includes program code, stored on the computer readable storage medium, for defining an analysis object comprising a data structure maintaining information necessary to perform an analysis of the goal with respect to the set of policies. The analysis object is configured to limit a number of calculations needed to achieve the goal. The computer program product includes program code, stored on the computer readable storage medium, for finding a set of expressions in the set of policies. Each member of the set of expressions has an output once solved. The output for the each member of the set of expressions is the same. The computer program product also includes program code, stored on the computer readable storage medium, for solving for the output for one member of the set of expressions. A solved output is created. The computer program product includes program code, stored on the computer readable storage medium, for caching the solved output in the analysis object such that the solved output is associated with the each member of the set of expressions. The computer program product also includes program code, stored on the computer readable storage medium, for processing the analysis object to create a set of values that achieves the goal. The processing includes referencing the cache to retrieve the solved output each time a member of the set of expressions is to be solved during the processing of the analysis object.

In yet another advantageous embodiment a data processing system comprises a bus, a storage device connected to the bus, and a processor unit connected to the bus. Program code is stored on the storage device. The processor unit is configured to execute the program code to receive a goal. The goal comprises a particular outcome to be achieved within the set of policies. The processor unit is configured to define an analysis object. The analysis object comprises a data structure maintaining information necessary to perform an analysis of the goal with respect to the set of policies. The analysis object is configured to limit a number of calculations needed to achieve the goal. The processor unit is configured to find a set of expressions in the set of policies. Each member of the set of expressions has an output once solved. The output for each member of the set of expressions is the same. The processor unit is configured to solve for the output for one member of the set of expressions. A solved output is created. The processor unit is configured to cache the solved output in the analysis object such that the solved output is associated with each member of the set of expressions. The processor is configured to process the analysis object to create a set of values that achieves the goal. The processing includes referencing the cache to retrieve the solved output each time a member of the set of expressions is to be solved during processing of the analysis object.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood with reference to the following detailed description of an advantageous embodiment of the present disclosure when read in conjunction with the accompanying drawings, wherein:

FIG. 9 is an illustration of a table of goals for a policy analysis system in accordance with an advantageous embodiment;

FIG. 10 is an illustration of a policy index in accordance with an advantageous embodiment;

FIG. 11 is an illustration of a reverse policy index of minterms in accordance with an advantageous embodiment;

DETAILED DESCRIPTION

Figure 1:
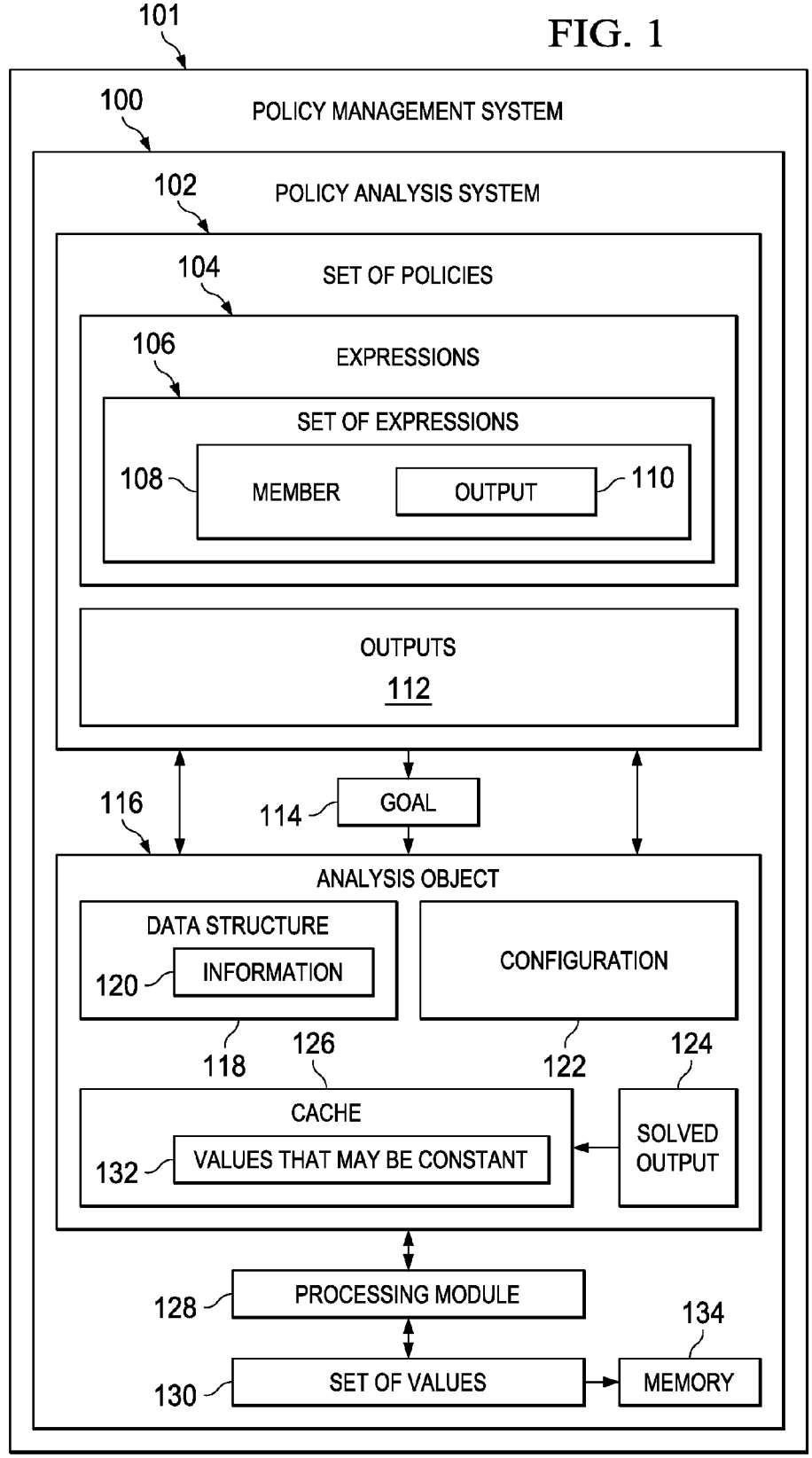
FIG. 1 is an illustration of a block diagram of a policy analysis system in which an advantageous embodiment may be implemented.

The present disclosure will now be described more fully hereinafter with reference to the accompanying drawings, in which preferred advantageous embodiments of the invention are shown. This invention may, however, be embodied in many different forms and should not be construed as limited to the advantageous embodiments set forth herein; rather, these advantageous embodiments are provided so that this disclosure will be thorough and complete, and will fully convey the scope of the invention to those skilled in the art.

The different advantageous embodiments recognize and take into account a number of considerations. For example, without limitation, the different advantageous embodiments recognize and take into account that creating and modifying complex policies for a domain problem that are valid, consistent, error-free, and/or that produce a desired result without side effects is problematic due to a current lack of tools and methods to aid in the design and analysis of policies.

The advantageous embodiments recognize that current solutions provide editors to assist users and analysts in creating new policies, but these policies frequently result in unintended side effects due to errors. A user may be, for example, without limitation, an analyst, a programmer, a policy author, or any other user.

Moreover, the advantageous embodiments recognize that current policy authoring tools do not provide effective responses to hypothetical scenarios. The advantageous embodiments also recognize that current policy analysis tools do not have the capability to explain how or why a policy decision is determined.

The advantageous embodiments also recognize that a need exists for policy analysis and authoring tools that enable a user to author policies which produce a desired result with fewer or no unintended side-effects. The advantageous embodiments also recognize a need for a policy analysis tool that aids a user in identifying and understanding logic, consistency, performance, and errors, or other issues, in a set of policies. As used herein, the term "set of policies" may refer to one or more policies.

The advantageous embodiments also recognize that existing policy management tools are "editors" which assist users in authoring and managing domain and protocol specific policies. In other words, existing policy management tools assist in authoring and managing policies restricted to only a single problem domain or protocol. These existing tools do not provide guided exploration of hypothetical "what if" scenarios. These existing tools do not have the capability to explain "how" a policy decision or result is determined. These existing tools may not aid in identifying and correcting logic errors in a set of policies.

The advantageous embodiments recognize these issues and address them according to the methods and devices described herein. The advantageous embodiments may avoid exhaustive evaluation of policies by means of novel methods for determining which policy elements are relevant to the analysis goals. The advantageous embodiments may prune irrelevant elements from the analysis, thereby allowing an analysis and explanation of systems that would otherwise be impossible to process in real time. In addition, the relevant policy elements may be cached so that if they need to be reused over and over, they only need to be computed once. A flexible reverse indexing scheme may allow the analyzer fast access to previously computed elements or cost effective solution methods, which can include look up of intermediate results usable to enable higher-level analysis results.

FIG. 1 is an illustration of a block diagram of a policy analysis system in which an advantageous embodiment may be implemented. Policy analysis system 100 may be implemented using one or more processors, such as those shown in FIG. 2. Optionally, policy analysis system 100 may be part of a larger policy management system used to author, store, control, modify, publish, or otherwise manage policies.

In an advantageous embodiment, policy analysis system 100 includes set of policies 102. Set of policies 102 may be expressed as one or more expressions 104, which may have outputs 112. Additionally, expressions 104 may include a particular set of expressions 106, which may be one or more expressions. A particular expression in set of expressions 106 may be described as member 108 of set of expressions 106. When evaluated or processed, member 108 may produce output 110. More generally, when expressions 104 are evaluated or processed, outputs 112 may be produced. As used herein, a policy rule may be an expression. A policy may be comprised of policy rules. A rule for a policy may comprise one or more expressions and an output. Outputs 112 may be comprised of one or more actions and a result value. For example, an action may be any action, and the result value may be a determination as to whether the action is allowed or denied when one or more of expressions 104 evaluate to true. In an advantageous embodiment, outputs 112 need not be at set of policies 102 level.

In an advantageous embodiment, the process of analyzing set of policies 102 may begin with receiving goal 114. Goal 114 may be a particular outcome to be achieved within set of policies 102. Goal 114 may be expressed in mathematical terms as a set of expressions. A particular illustrative example of a goal might be "find the role with the least privileges that will allow employee 'X' to have read access to a particular document 'D' within a complex set of policies that restrict access to that particular document." Another illustrative example of a goal might be "explain why employee 'X' is not allowed to access a particular document 'D' within the set of policies that restrict access to that particular document." In this latter case, the goal may be to identify one or more policies that cause employee "X" to be restricted from accessing the document.

Returning to an exemplary process for analyzing policies, analysis object 116 may be defined. Analysis object 116 may include data structure 118. Data structure 118 may include information 120 necessary to perform an analysis of goal 114 with respect to set of policies 102. Data structure 118 may include other information useful to performing an analysis. Additional data structures may be present.

Analysis object 116 also may have configuration 122. Configuration 122 represents data indicating a configuration of analysis object 116 that will limit a number of calculations needed to achieve goal 114.

As indicated above, a substantial issue that may arise during policy analysis is computational explosion. Computational explosion is defined as a result of a requested computation in which an excessive number of computations is required to compute goal 114, or when a combinatorial explosion occurs. The term "excessive" is defined as a sufficient number of computations so as to render execution of the computation undesirable, such as if the resulting computation will take too long to compute within a given time constraint or perhaps the computation will exceed the computational ability of a given computer. The term "combinatorial explosion" means that, when solving a problem, a huge number of possible combinations are created by increasing the number of entities which can be combined.

Because of the possible complexity in set of policies 102, computing goal 114 by analyzing all possible policies and policy combinations may be computationally explosive. In some cases, computing nearly any goal 114 may be computationally explosive.

The advantageous embodiments described herein achieve computation of goal 114 while avoiding a computational explosion. The advantageous embodiments provide several different techniques for avoiding a computational explosion. One such technique is to configure analysis object 116 with configuration 122 in such a manner as to limit the number of calculations that will need to be performed to compute goal 114.

In another advantageous embodiment, continuing the process described above, another technique for avoiding a computational explosion may be to find set of expressions 106 in set of policies 102. Each member 108 of set of expressions 106 may have output 110 once solved. Output 110 for each member 108 of set of expressions 106 may be the same in this advantageous embodiment.

Next, one or more processors solve for output 110 for a single member 108 in set of expressions 106. Solved output 124 is created. Next, solved output 124 is cached in cache 126 of analysis object 116. However, cache 126 may be outside of analysis object 116. In any case, solved output 124 is cached such that solved output 124 is associated with each member 108 in set of expressions 106.

Next, analysis object 116 is processed in processing module 128 to create set of values 130 that achieves goal 114. In other words, set of values 130 are those values that, when applied to set of policies 102, establish the desired output, which is goal 114. In an advantageous embodiment, processing may include referencing cache 126 to retrieve solved output 124 each time member 108 of set of expressions 106 is to be solved during processing of analysis object 116. In this manner, instead of re-determining or re-calculating outputs for members of set of expressions 106 that have the same output, that output may be more easily retrieved from cache 126. Likewise, values that may be constant 132, including user-asserted values or constant values received by processing module 128, may also be stored in cache 126 and retrieved during processing by processing module 128. Thus, any member 108 in set of expressions 106 that has solved output 124 that is constant may be stored in cache 126 and retrieved during processing of analysis object 116 by processing module 128.

After processing, set of values 130 may be stored in memory 134. Memory 134 may be any tangible memory, such as those described in FIG. 2.

In an advantageous embodiment, another technique for configuring analysis object 116 to reduce the incidence of computational explosion is described. When the expressions are not evaluated or solved immediately after authoring, or during the analysis specification process, only those expressions which are relevant to an analysis are evaluated or solved.

In this case, cached values may be computed as needed or desired by a background processing task or in response to specific user actions or system events. Once a cached value is computed, the cached value need not be recomputed unless the policy element from which the cached value was computed is changed. The first time cached values may be computed may be concurrent with expression authoring time, or immediately after an expression is authored. This first time might be concurrent with operation of a policy checker that verifies that a policy is well-formed and syntactically correct. The second time may be when the user is setting up an analysis, such as when spare compute cycles may be available. The third time may be when an analysis is initiated. In other advantageous embodiments, cached values might be evaluated at other, different times. In other advantageous embodiments, cached values might be evaluated at multiple times, such as combinations of the above times.

In an advantageous embodiment, policy analysis system 100 may be part of or connected to policy management system 101. Policy management system 101 may have one or more components for managing, creating, correcting, modifying, or taking some other action with respect to set of policies 102. In an illustrative example, policy management system 101 may provide an overall framework for creating policies, analyzing them with policy analysis system 100, and then editing, managing, correcting, or creating new policies based on a result of a policy analysis performed by policy analysis system 100. Policy management system 101 may include many different components that are not shown, one of which might be policy analysis system 100. Many other arrangements are possible.

The advantageous embodiments may also be described as follows. In an advantageous embodiment, processing module 128 pre-computes and indexes the result space for a set of policies and their rules or expressions to enable a user to efficiently explore this space, to answer queries regarding the values of clauses and rules, the importance of individual policy attributes, as well as the existence of similar rules that have a desired result. The advantageous embodiments may be used to assist a user in efficiently analyzing a set of policies and their rules to answer questions about those policies.

Examples of questions might be the conditions under which desired results can be achieved, the relative importance of policy attributes, the similarity of policies, and others.

Generally, policies govern information protection and sharing, quality management services (QMS) policies govern computing resource utilization, and network management policies govern computing network design, deployment, and administration. Authoring a set of complex policies for a domain problem that is valid, consistent, and error-free and that produces the desired output without side effects may be problematic due to a lack of tools and methods to aid in the design and analysis of policies. An example of such a set of complex policies may be, without limitation, to restrict access to a resource to specific desired conditions.

The advantageous embodiments address two problems in this regard. First, the advantageous embodiments address enabling a user individually, or in concert with others, in developing an in-depth understanding of a set of complex policies unfamiliar to the user, such as when the set of complex policies is authored by others. Second, the advantageous embodiments address enabling such a user to author a set of policies which produces the desired result with fewer unintended side-effects.

The advantageous embodiments may avoid computationally explosive calculations by the use of minterms, which are described further below. In an additional technique, the advantageous embodiments may avoid computationally explosive calculations by caching invariant results and constructing invariant expressions that may be later referenced. In another technique, the advantageous embodiments may further avoid computationally explosive calculations by eliciting value assertions from a user that reduces the number of attribute-value configurations to be evaluated.

The advantageous embodiments also provide a capability to aid a user in analyzing a wide variety of computing policy types or protocols. The advantageous embodiments are not limited to a single policy type or protocol, such as extensible Access Control Markup Language (XACML).

The advantageous embodiments may provide a goal-oriented "wizard" or other workflow to guide a user in developing an in-depth understanding of a set of policies and conducting "what-if?" studies and experiments on a set of policies. The advantageous embodiments may also be used to assist a user in resolving common problems associated with authoring a set of policies, such as set of policies 102.

The advantageous embodiments may provide a means to answer a wide range of questions about a set of policies, such as, but not limited to, those noted below. In the case of authorization policies, one or more of the following questions, or combinations thereof, might be answered by policy analysis system 100.

A series of example questions are provided below. Some of these example questions may also be reflected in FIG. 9, though in a different format. An example question may be "What actions are allowed or permitted by a set of policies?" In a more specific example, given a set of policies and a set of value assertions, such as a validation scenario or "what if" condition, a goal may be to enumerate all of the actions which are allowed, those which are denied, and those for which insufficient information is available to make a determination.

Another example question may be "Which actions, in a given set of actions, are denied or not permitted by a set of policies?" In a more specific example, given a set of asserted actions, a goal may be to determine which, if any, of the enumerated actions is allowed or denied.

Another example question may be to identify the policies that allow or permit a given action or set of actions. In a more specific example, a goal may be, given a set of asserted actions and desired outcome, to determine which, if any, of a given set of policies produce that outcome.

Another example question may be to identify which policies deny or do not permit a given action or set of actions. Another example question may be to enumerate some or all of the conditions under which a set of policies allow or deny an action. Another example question may be to identify or enumerate some or all of the conditions under which a set of policies produce a desired outcome.

Another example question may be, "What are the conditions under which a set of policies produces an undesired output?" A more specific example may be, given a set of policies and desired and undesired outputs, determine which, if any, of the undesired outputs are coincident with the desired outputs.

Another example question may be, "What are the conditions under which a set of policies produce an indeterminate result?" An intermediate result may be that the policies are not applicable, do not produce relevant results, or produce conflicting or otherwise indeterminate results.

Another example question, applicable to any particular set of policies, an example question may be, "What is the impact of a change in the operational environment or policy requirements?" A more specific example may be, given a set of policies, to determine the sensitivity of the policy outputs to alternative attribute value configurations. Another example question may be, "How does a change in the problem domain or the domain model affect a set of policies and what outputs are changed as a consequence?" A more specific example may be, given a set of policies, which policies are affected when the definition of a particular attribute is changed.

Another example question may be, "How do changes in a set of policies affect the outputs of the policy set?" That is, "What are the changes in the outputs of a set of policies due to particular changes in expressions of that set of policies?"

Another example question may be, "How can a set of operational or environmental conditions be changed to produce a desired output?" Another example question may be, "How can a set of policies be modified to produce a desired output?"

Another example question may be, "Which policies may be modified without affecting an output?" Another example question may be, "Which domain model elements or domain requirements may be changed without affecting an output?"

Another example question may be, "What changes are needed in the definition of a domain or the domain requirements to produce a desired output?" Another example question may be, "How can the conditions defining a scenario be modified to change the output?"

Another example question may be, "What is the percentage coverage for a set of policies, or what is the ratio of the states for which a valid policy is defined to all possible states?" Many other questions are also possible. Therefore, the examples, questions, and goals described above do not necessarily limit the inventions described herein.

The advantageous embodiments described above and below, such as policy analysis system 100, may be used to answer any of these questions. Thus, the advantageous embodiments enable a user to assert various attribute values and explore the effect of these assertions on the policy outputs. The advantageous embodiments can suggest which attributes referenced by policies make the most significant contribution to the complexity of a problem, and thus would be most productive to constrain. No other existing policy system can answer these questions answerable using policy analysis system 100.

In an alternative advantageous embodiment, policy analysis system 100 may be termed an "analyzer." Inputs to the analyzer may be an arbitrary set of policies expressed in a desired syntax and a domain model for the domain of the policy set identified above. The domain model may define the roles for policies which employ roles, attributes, possible attribute values, possible actions, and possible result types referenced in the above set of policies. The domain model may define more roles, attributes, and other policy elements than those utilized in a particular set of policies.

The analyzer may also take as input the values for any attributes that a user wishes to assert or test as part of an analysis. The analyzer may also take as input values the goal of the analysis, such as goal 114. Goal 114 may be a request to solve for the value of one or more attributes which would allow a subject to perform an action, examine the "side-effects" associated with a set of policies, or others. An example of a side-effect may be that authorizing person A to perform an action also authorizes person B to perform that same action where the authorization of person B is unintended.

The analyzer may provide a mechanism for the user to assert the possible values for any of the attributes referenced in a set of policy rules. By this mechanism, the user may exploit knowledge about the domain to restrict the search space to a manageable size. The analyzer may also calculate the number of possible attribute configurations, given the current attribute definitions and assertions. Typically, the number of possible configurations may be large, since this number is the product of the number of choices for each attribute. If the number of configurations is infeasible, the analyzer may warn the user and provide an opportunity to further restrict the possible attribute values. In an advantageous embodiment, for each possible configuration of attribute values, the analyzer may calculate the output for each rule and the overall outputs for the policy.

In an advantageous embodiment, a vector space may be defined, where the vector space components are the individual attribute settings and rule outputs and the overall policy outputs for each configuration. If the user had asserted a single value for each attribute, this vector space would be a singleton. Typically, the user may wish to leave some attribute values unspecified, so that the resulting vector space contains many elements and has an interesting structure. The analyzer allows the user to explore this structure.

The analyzer may answer "how" or "why" questions about the outputs by searching the vector space of configurations and outputs. The analyzer can explain the overall result by identifying the rules for which a sufficient number of necessary conditions are satisfied or have been satisfied. Furthermore, the analyzer can explain why the conditions of a rule were not satisfied by listing the disjunctive normal form minterm expressions that were satisfied or not satisfied. Disjunctive normal form terms are conjunctions of attribute expressions and are described further below. The analyzer may also explain which attribute expressions were the sole negative components of a minterm or expression that otherwise would have been satisfied.

The analyzer may look for configurations that are "nearby" another one in the vector space. Thus, the analyzer can determine whether the overall result could be changed by only changing one attribute value or perhaps a limited number of attribute values.

The analyzer may rank the attributes and expressions in terms of the relative importance of the policy element to the policy outputs. Standard algorithms for information entropy and information gain, such as that used by the decision tree machine learning algorithm Iterative Dichotomizer 3 (ID3), may be used to estimate the contribution of individual policy elements to the policy outputs, and a particular analysis. Knowing the relative influence of a particular policy element on the policy output helps the user to design effective and correct policies.

Thus, the analyzer allows the user to assert attribute values, as well as to leave some attributes unspecified. The analyzer then may answer queries from the user regarding the results over this space of hypothetical scenarios.

The analyzer may answer queries of why a policy result was produced or not produced by stating the rule or rules that allowed or denied the result, or the applicable rules that could have allowed or denied the result but were not satisfied by the attribute settings. Furthermore, the analyzer may allow the user to explore individual rule results by asking why a rule fires. The analyzer is able to answer these questions by transforming a rule's logic into disjunctive normal form and then displaying the particular disjunctive normal form clauses that were active. Each disjunctive normal form clause indicates a combination of attributes that suffices for satisfying the rule.

The analyzer can explain why a particular rule did not apply by identifying individual expressions that were not satisfied for particular disjunctive normal form terms. The analyzer may also allow the user to explore the policy design space by comparing results for different scenarios or sets of value assertions and by showing scenarios that are close to a given scenario provided by the user and yield the same or opposite results.

The analyzer can also answer questions regarding the sensitivity of various attributes by showing, in a particular context of attribute settings, which attributes may be changed without changing the result. The analyzer can provide a ranking of attributes in terms of their significance or influence over the results of the policy.

The illustration of policy analysis system 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 2:
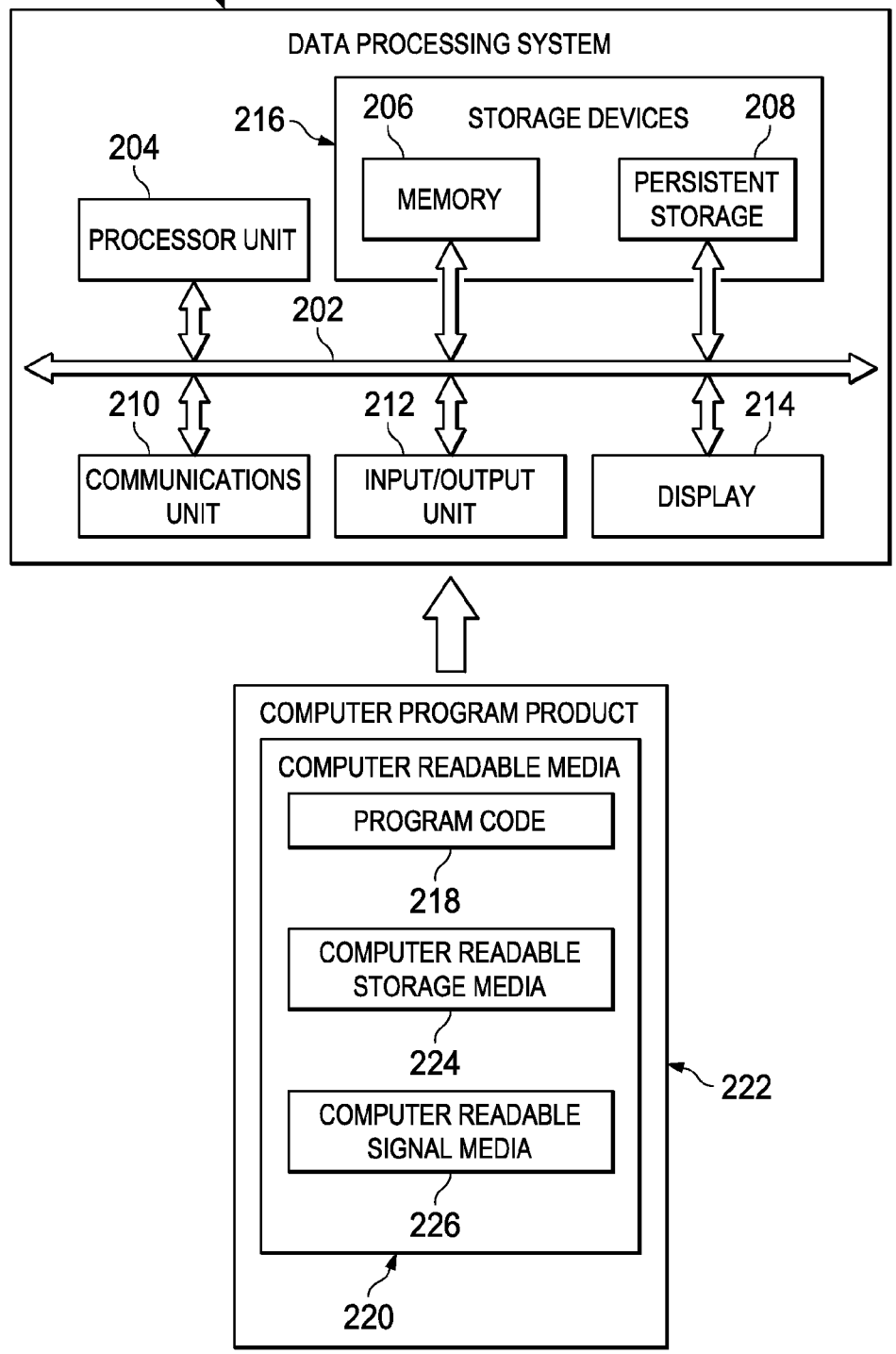
FIG. 2 is an illustration of a data processing system in accordance with an advantageous embodiment.

Turning now to FIG. 2, an illustration of a data processing system is depicted in accordance with an advantageous embodiment. Data processing system 200 may implement policy analysis system 100 in FIG. 1 and/or policy analyzer 800 in FIG. 8. However, the policy analysis techniques described herein may be implemented using highly distributed processing, such as grid computing, cloud computing, vector computing, and others. Thus, data processing system 200 might represent many data processing systems in a distributed or network environment. With respect to the advantageous embodiments described herein, individual policy sets, even individual rules, could be analyzed on different devices or processors. In this case, the results may be transmitted to one or more data processing systems. The results may also be combined to increase the scalability and throughput of a policy analyzer, such as policy analyzer 800 of FIG. 8. As used herein, the term "scalability" refers to policy size or complexity.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a number of processors, a multi-processor core, a virtual processor, an emulated system, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216 that may be used in conjunction with the advantageous embodiments described herein. A storage device is any piece of hardware that is capable of storing information, such as, for example, without limitation, data, program code in functional form, and/or other suitable information, either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218 rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic or quantum-based semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
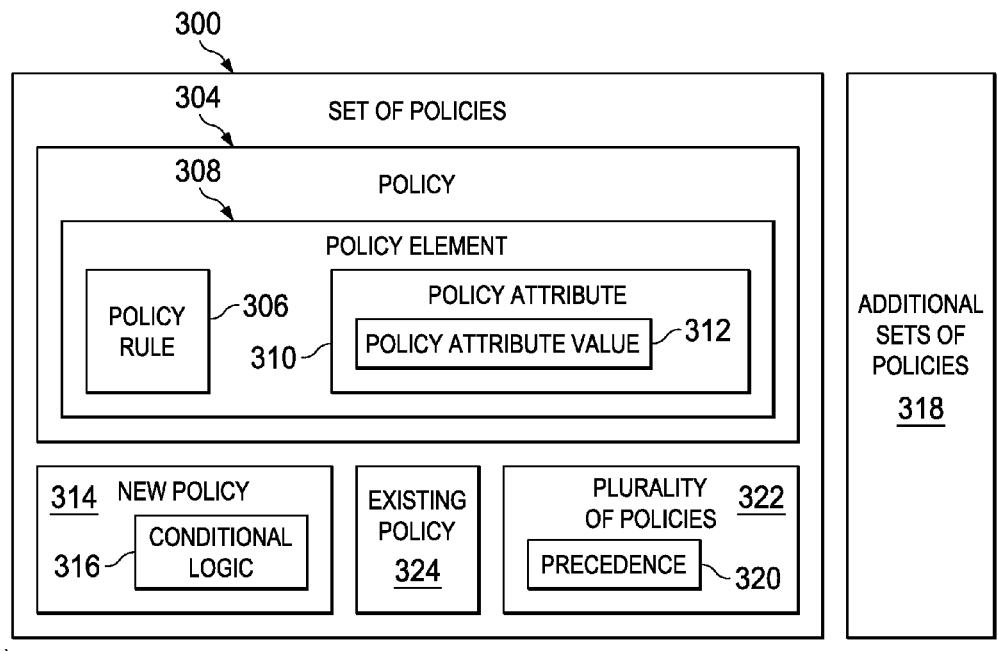
FIG. 3 is an illustration of a block diagram of sets of policies in accordance with an advantageous embodiment.

FIG. 3 is an illustration of a block diagram of sets of policies in accordance with an advantageous embodiment. Set of policies 300 may be policy analysis system 100 of FIG. 1. Thus, the description of set of policies 300 and additional sets of policies 318 adds additional detail to the description provided above with respect to FIG. 1. Additionally, like terms in FIG. 3 with respect to FIG. 1 may be similar to each other or the same as each other.

Set of policies 300 may include policy 304. Policy 304 may include one or more aspects. For example, policy 304 may include policy element 308. Policy element 308 may include policy rule 306 or policy attribute 310. In turn, policy attribute 310 may include policy attribute value 312.

Policy rule 306 may be distinguished from policy 304 in that a rule may be part of policy element 308. In an alternative advantageous embodiment, a policy may be a rule. Policy element 308 is distinguished from policy 304 in that a policy element may be any sub-component of a policy, such as a single expression. More generally, policy element 308 may be an action, an authorization decision, a subject attribute, a resource attribute, a relationship between an attribute and some other value, or possibly other aspects of policy 304. Conditional logic 316 may be built up from comparisons of policy attributes, such as policy attribute 310, and possibly other values. An authorization decision may be a result value of an application of set of policies 300.

Policy attribute 310 may be distinguished from policy 304 in that an attribute may be part of policy element 308. Thus, an expression may be made up of one or more policy elements.

However, policy attribute 310 may itself be or be part of policy 304 in some instances, or it may be or be part of policy rule 306 in some instances.

In an advantageous embodiment, a technique for avoiding computational explosions is to deal with new policies as they arise. Thus, for example, as new policy 314 is received or authored, conditional logic 316 may be solved for new policy 314. In another example, as new policy 314 is received or authored, a set of cached value sets that satisfy particular minterms may be determined.

In another advantageous embodiment, computational explosions may also be avoided by configuring an analysis object, such as analysis object 116 of FIG. 1, to limit the number of calculations performed when determining a goal, such as goal 114 of FIG. 1. This configuration may be achieved by eliminating one or more of the following from the analysis object: policy 304, policy element 308, policy rule 306, policy attribute 310, and policy attribute value 312. In the case where any of these aspects of set of policies 300 are irrelevant to the goal, these aspects may be eliminated to reduce the number of calculations needed to achieve the goal.

The configuration of analysis object 116 in FIG. 1 that limits the number of calculations may also be performed by specifying that processing of policy attribute value 312 in set of policies 300 is to be avoided. Avoidance of processing of policy attribute value 312 may be specified when policy attribute value 312 is not relevant, when policy attribute value 312 has already been computed and the result stored, when policy attribute value 312 is constant and may be referenced easily from a cache, or otherwise as desired. Likewise, the configuration of analysis object 116 in FIG. 1 that limits the number of calculations may also be performed by specifying that processing of additional set of policies 300 is to be avoided.

In another advantageous embodiment, computational explosion may be avoided by using precedence 320 for plurality of policies 322 in set of policies 300 to guide processing of the analysis object, such as analysis object 116 of FIG. 1. The term "precedence" refers to the relative order of priority of ones of the plurality of policies 322. Thus, plurality of policies 322 should be resolved or be designated to be resolved in an order of priority. If the goal is achieved or achievable before resolving all of plurality of policies 322, then additional computations may be avoided.

In another advantageous embodiment, authoring new policy 314 may cause conditional logic 316 of new policy 314 to be solved immediately. In addition, changing existing policy 324 may also cause conditional logic 316 of new policy 314 to be solved immediately. In either case, the results of solving new policy 314 may then be stored in a cache, such as cache 126 of FIG. 1. Thus, solving conditional logic 316 of new policy 314 may be responsive to authoring new policy 314 or changing existing policy 324.

The illustration of set of policies 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
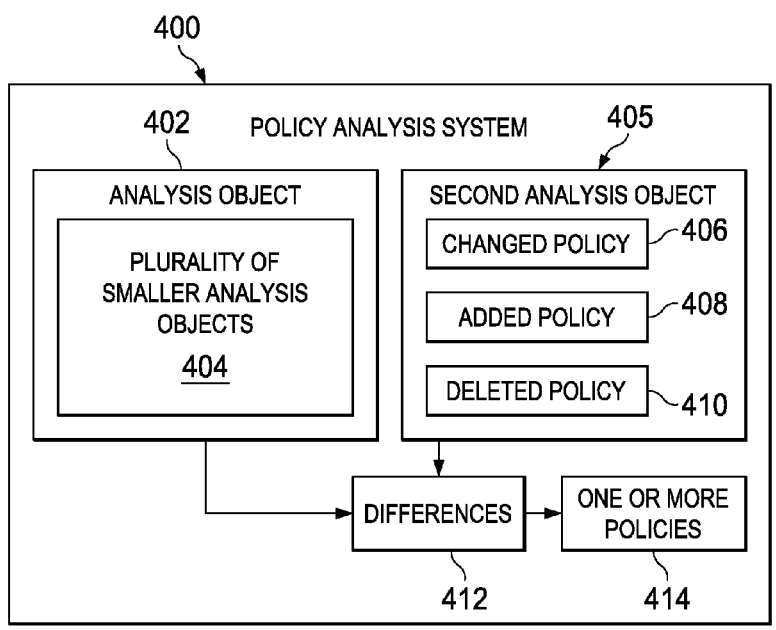
FIG. 4 is an illustration of a block diagram of a policy analysis system in accordance with an advantageous embodiment.

FIG. 4 is an illustration of a block diagram of a policy analysis system in accordance with an advantageous embodiment. Policy analysis system 400 may be policy analysis system 100 of FIG. 1. Thus, the description of analysis object 402 in FIG. 4 adds additional detail to the description provided above with respect to FIG. 1. Additionally, like terms in FIG. 4 with respect to FIG. 1 may be similar to each other or the same as each other.

In an advantageous embodiment, an action may be selected from the group consisting of: changing a policy, such as policy 304 of FIG. 3, adding such a policy, and deleting such a policy. Note that policy elements, such as minterms and attribute value configurations, may also be added or removed from analysis object 402. This analysis system can be used when adding or removing policies from analysis object 402, as well as when an action is performed after policy authoring or editing. Combinations of these actions may also be performed.

As a result of one or more of these actions, second analysis object 405 may be formed. Second analysis object 405 may include changed policy 406, added policy 408, deleted policy 410, and/or combinations thereof. The actions that form second analysis object 405 enable an analysis to be partitioned or otherwise simplified to avoid computational explosion, to provide the user partial results, and/or to enable the user to see how changes in the policy specification and code result in changes in the outputs of a policy or policy set.

In this case, differences 412 between analysis object 402 and second analysis object 405 may be identified. Differences 412 may be related to changes in one or more policies 414 associated with both analysis object 402 and second analysis object 405.

Another technique for avoiding computational explosions is to decompose analysis object 402 into plurality of smaller analysis objects 404. In this case, plurality of smaller analysis objects 404 may be processed individually. By decomposing analysis object 402 into plurality of smaller analysis objects 404, additional complexities deriving from larger sets of policies may be avoided. Additionally, individual ones of plurality of smaller analysis objects 404 may be processed by different physical or virtual machines and the results combined later. As mentioned above, a second analysis may be used to assess how changes in the specification and code of analysis object 402 affect the outputs of a set of policies, such as set of polices 102 of FIG. 1 or set of policies 300 of FIG. 3.

The illustration of policy analysis system 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
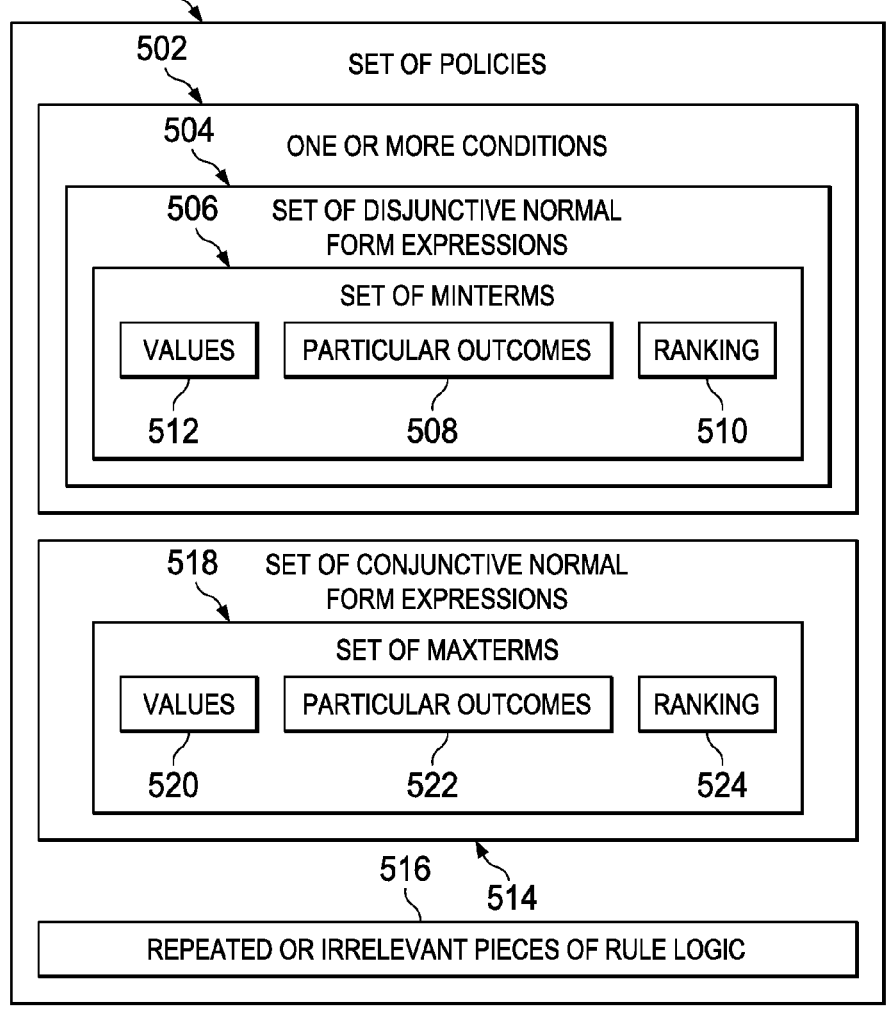
FIG. 5 is an illustration of a block diagram of a set of policies in accordance with an advantageous embodiment.

FIG. 5 is an illustration of a block diagram of a set of policies in accordance with an advantageous embodiment. Set of policies 500 may be set of policies 102 of FIG. 1 or set of policies 300 of FIG. 3. Thus, the description of set of policies 500 in FIG. 5 adds additional detail to the description provided above with respect to FIG. 1 and FIG. 3. Additionally, like terms in FIG. 5 with respect to FIG. 1 or FIG. 3 may be similar to each other or the same as each other.

In an advantageous embodiment, a technique for configuring an analysis object, such as analysis object 116 of FIG. 1, to reduce the possibility of a computational explosion is to express one or more conditions 502 in set of policies 500 as set of disjunctive normal form expressions 504. One or more conditions 502 may be, in a non-limiting advantageous embodiment, conditional logic 316 in FIG. 3. A disjunctive normal form is defined as a Boolean expression, such as in the case of a policy's condition, as the logical "OR" of set of minterms 506. A minterm is defined as the logical "AND" of a set of elements of a policy.

Thus, set of disjunctive normal form expressions 504 may comprise set of minterms 506. Thereafter, a processor may compute what values 512 cause set of minterms 506 to have particular outcomes 508. In this manner, the goal may be computed using fewer total computations.

A further, or possibly alternative, technique may be used to reduce the number of computations needed to compute the goal. For example, ranking 510 may be determined for set of minterms 506. Ranking 510 may be used to rank set of minterms 506 in a particular order to be solved. Set of minterms 506 may then be processed in the particular order. Processing set of minterms 506 in a particular order may allow the overall computation to take place faster by providing values 512 of set of minterms 506 to be cached for later use or by logically eliminating lower priority minterms in set of minterms 506. Ranking 510 may be the rank order of the set of minterms 506, where the minterms are ordered based upon the expected information gain associated with the minterm and other minterm properties. However, other methods of rank ordering set of minterms 506 may be used.

Another further, or possibly alternative, technique may be used to reduce the number of computations needed to compute the goal. In this case, one or more conditions 502 in set of policies 500 may be expressed as set of conjunctive normal form expressions 514. A conjunctive normal form is defined by rendering an expression as the logical "AND" of set of maxterms 518. A maxterm is defined as a logical "OR" of a set of elements. In an advantageous embodiment, a clause in logic denotes a disjunction "OR" of literal elements.

Use of set of conjunctive normal form expressions 514 may be particularly valuable to factoring out repeated or irrelevant pieces of rule logic 516 from set of policies 500. Thereafter, a processor may compute what values 520 cause set of conjunctive normal form expressions 514 to have particular outcomes 522.

As with ranking 510 of set of disjunctive normal form expressions 504, ranking 524 may be determined for set of maxterms 518. Ranking 524 may be used to rank set of maxterms 518 in a particular order to be solved. Set of maxterms 518 may be processed in the particular order. Processing set of maxterms 518 in a particular order may allow the overall computation to take place faster by providing values 520 of set of maxterms 518 to be cached for later use or by logically eliminating lower priority maxterms in set of maxterms 518. Ranking 524 may be the rank order of the set of minterms 506, where the minterms are ordered based upon the expected information gain associated with the minterm and other minterm properties.

The illustration of set of policies 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
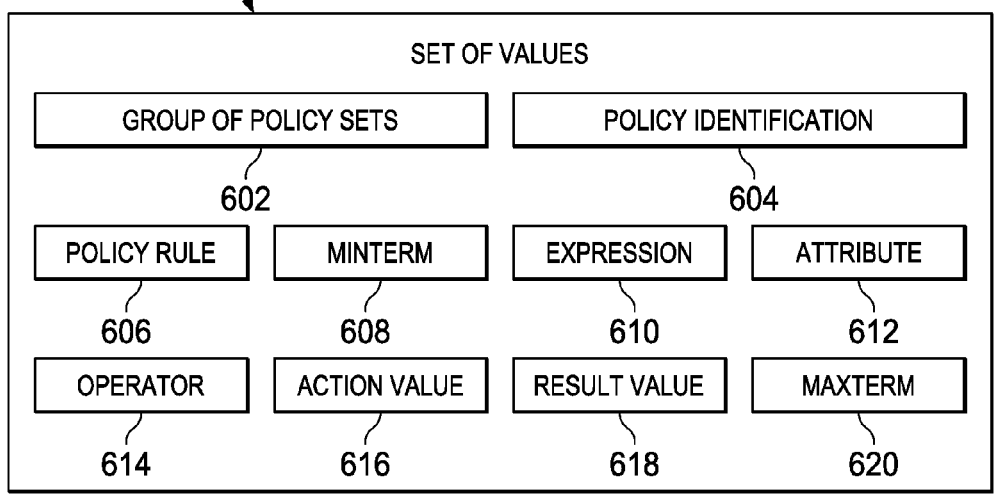
FIG. 6 is an illustration of a set of values for a policy analysis system in accordance with an advantageous embodiment.

FIG. 6 is an illustration of a set of values for a policy analysis system in accordance with an advantageous embodiment. Set of values 600 may be set of values 130 of FIG. 1. Thus, the description of set of values 600 in FIG. 6 adds additional detail to the description provided above with respect to FIG. 1. Additionally, like terms in FIG. 6 with respect to FIG. 1 may be similar to each other or the same as each other.

Set of values 600 provides examples of what is meant by the term "value" as used herein. Generally, a value is a number or a designation that provides a specific, usually quantitative, description of an item in question. A value need not be a number. For example, an item may be identified as a "user" and may have a value comprising a particular name chosen from a list of names corresponding to a number of specific people.

Examples of values are shown in set of values 600. For example, set of values 600 may include values for group of policy sets 602, policy identification 604, policy rule 606, minterm 608, expression 610, attribute 612, or operator 614. Set of values 600 may also include action value 616, result value 618, or maxterm 620. Many other examples of values may also be provided.

Figure 7:
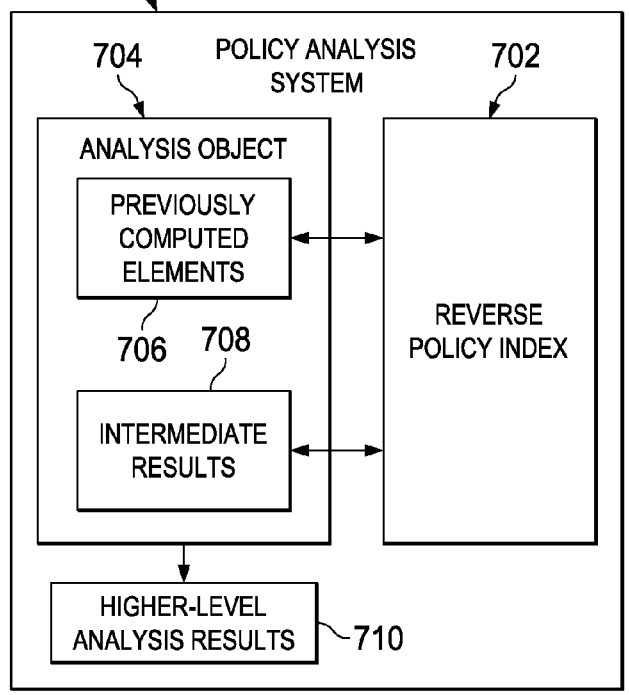
FIG. 7 is an illustration of a policy analysis system in accordance with an advantageous embodiment.

FIG. 7 is an illustration of a policy analysis system in accordance with an advantageous embodiment. Policy analysis system 700 may be policy analysis system 100 of FIG. 1 or policy analysis system 400 of FIG. 4. Thus, the description of policy analysis system 700 in FIG. 7 adds additional detail to the description provided above with respect to FIG. 1 and FIG. 4. For example, analysis object 704 may be analysis object 116 of FIG. 1. Additionally, like terms in FIG. 7 with respect to FIG. 1 and FIG. 4 may be similar to each other or the same as each other.

In an advantageous embodiment, reverse policy index 702 may be used to further reduce the possibility of a computation explosion when computing a goal. Reverse policy index 702 may be part of an analysis object, such as analysis object 116 of FIG. 1. Reverse policy index 702 is termed "reverse" because the index is used to find policies, policy elements, or other values meeting specified criteria. Thus, for example, policies in reverse policy index 702 may be in an indexed structure where minterms are more important than policies. This indexing arrangement is useful where only minterms are the space to be computed or searched during processing of analysis object 704 to achieve the goal. An example of a reverse policy index is described with respect to FIG. 11. Uses of a reverse policy index are further described with respect to FIG. 8 and FIG. 11.

In an advantageous embodiment, a method of using reverse policy index 702 may include using reverse policy index 702 to provide previously computed elements 706 to analysis object 704 during processing. Reverse policy index 702 may also be used to look up intermediate results 708 needed to enable higher-level analysis results 710.

The illustration of policy analysis system 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
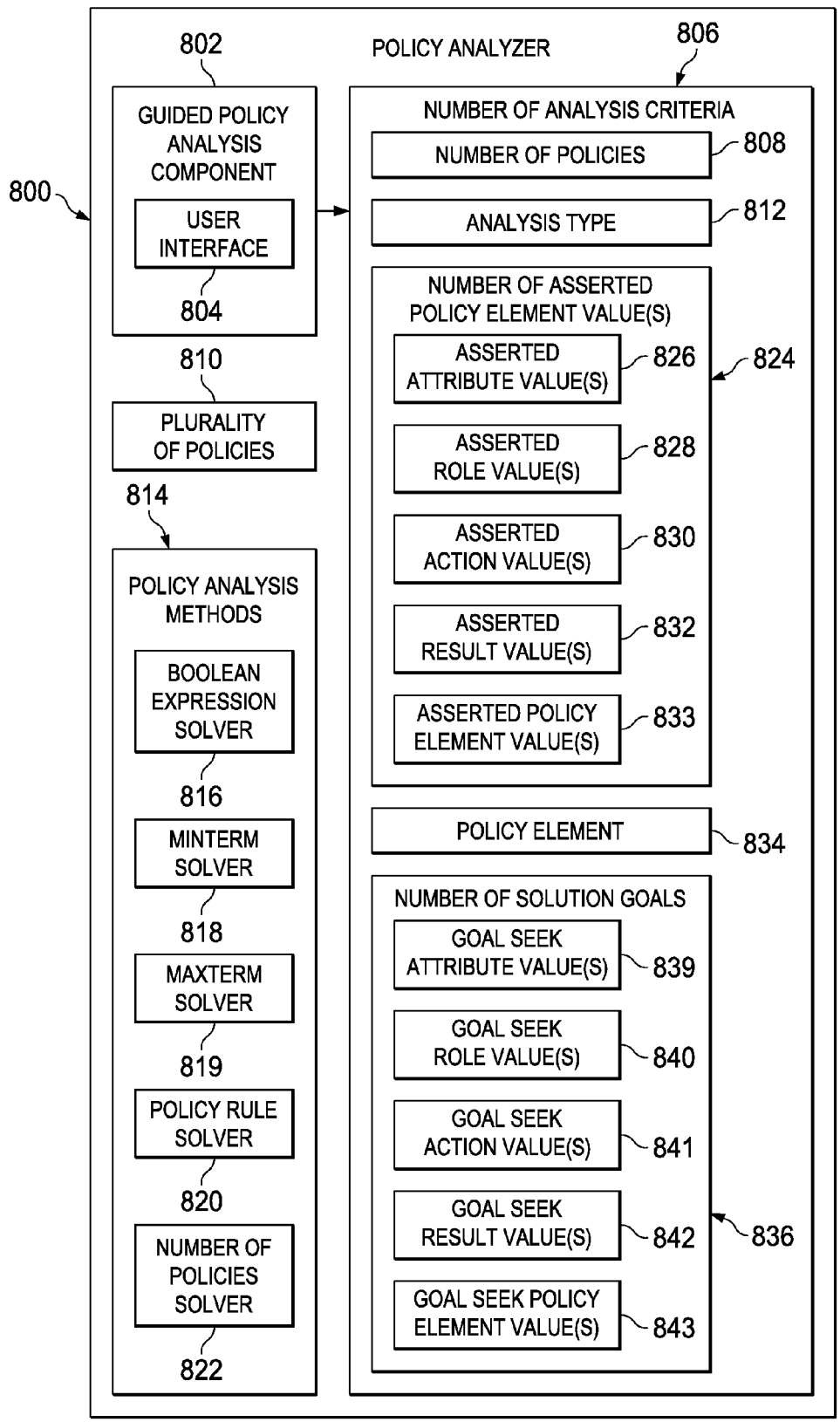
FIG. 8 is an illustration of a policy analyzer in accordance with an advantageous embodiment.

FIG. 8 is an illustration of a policy analyzer in accordance with an advantageous embodiment. Policy analyzer 800 is a policy analysis tool, which may be used to analyze policies to achieve a goal, such as set of policies 102 and goal 114 of FIG. 1. Thus, policy analyzer 800 may be a part of policy analysis system 100 of FIG. 1, policy analysis system 400 of FIG. 4, or policy analysis system 700 of FIG. 7. In a particular illustrative example, policy analyzer 800 may be processing module 128 of FIG. 1. Terms in FIG. 8 similar to those used in FIGS. 1-7 may be similar to or the same as like terms in FIGS. 1-7.

Policy analyzer 800 may include guided policy analysis component 802. Guided policy analysis component 802 may be a tool or process that, among other actions, may interact with a user to obtain user input defining the scope of a policy analysis and then compute one or more goals. Guided policy analysis component 802 may be an active process that sets up a framework for a new analysis, focusing only on relevant elements. In an advantageous embodiment, the user or guided policy analysis component 802 may evaluate or analyze a set of policies, a single policy, a set of minterms, a single minterm, a set of minterm expressions, a single minterm expression, a set of maxterms, a single maxterm, a set of maxterm expressions, or a single maxterm expression. In another advantageous embodiment, guided policy analysis component 802 may also include an overall analysis process controller that orchestrates the application of individual analysis methods to meet the analysis goals while satisfying all applicable criteria.

Guided policy analysis component 802 may include user interface 804. User interface 804 may be implemented as any type of input and/or output device that is currently available or that may become available in the future. User interface 804 may be, for example, without limitation, a keyboard, mouse, display screen, touch screen, voice recognition system, graphical user interface, menu-driven interface, or any other type of interface device for obtaining input from a user and/or providing output to the user.

User interface 804 may enable a user to enter user-defined values of attributes, roles, and other user-defined criteria on the policy analysis. In one illustrative example, guided policy analysis component 802 prompts a user to enter number of analysis criteria 806 and other information needed to perform the analysis of number of policies 808 through user interface 804.

Guided policy analysis component 802 guides a user in selecting number of analysis criteria 806 for a policy analysis. Number of analysis criteria 806 may be user input, input from another process, or any other received input. Number of analysis criteria 806 may be placed into policy analyzer 800 to limit or restrict the scope of the policy analysis.

Number of analysis criteria 806 may include the user-selected number of policies 808. Number of policies 808 may be one or more computing and/or information systems policies to be analyzed, such as set of policies 102 in FIG. 1.

A user may select number of policies 808 from plurality of policies 810. Number of policies 808 selected by the user may be an additional requirement within number of analysis criteria 806. In other words, when a user selects one or more policies to be analyzed, those selected number of policies 808 may be a further limitation on the scope of the policy analysis. Number of policies 808 may include a single policy from plurality of policies 810, all the policies in plurality of policies 810, or a subset of the policies in plurality of policies 810.

Analysis type 812 may be a analysis requirement that identifies one or more types of policy analysis methods 814 to be performed on number of policies 808. Analysis type 812 may be a single analysis type selected by the user. In another advantageous embodiment, analysis type 812 may identify two or more of the analysis types in policy analysis methods 814 to be performed on number of policies 808.

In one illustrative example, policy analysis methods 814 are methods for evaluating policy rules and identifying possible attribute value configurations and outputs for those policy rules. Policy analysis methods 814 may include possible policy analysis methods that may be performed on one or more policies in number of policies 808. However, the advantageous embodiments are not limited to performing only those analysis types shown in FIG. 8. The advantageous embodiments may be implemented to perform any type of policy analysis type or method.

Boolean expression solver 816 may be used to perform a policy analysis on number of polices 808. Boolean expression solver 816 may solve for the values of each attribute referenced within a Boolean expression so that the expression evaluates to either true or false. The attribute values of a Boolean expression, which produce a true or false result, are saved in a cache memory, such as cache 126 in FIG. 1. The attribute values are indexed in a reverse policy index, such as reverse policy index 702 in FIG. 7.

Minterm solver 818 may be used to perform a policy analysis that determines whether a minterm of a policy in number of policies 808 evaluates to true or false. In an advantageous embodiment, a "minterm" is the logical "AND" of a set of elements of a policy. A condition may take a disjunctive normal form. A disjunctive normal form renders a Boolean expression, such as in the case of a policy's condition, as the logical "OR" of a set of minterms. An example of a minterm may be ((day=Monday) AND (time=12:00 pm)) OR ((day=Monday) AND (time=11:00 am)).

In turn, a conjunctive normal form renders the expression as the logical "AND" of a set of maxterms. A maxterm is a logical "OR" of a set of elements. An example of a maxterm may be ((day=Monday) AND ((time=12:00 pm) OR (time=11:00 am)).

In another non-limiting advantageous embodiment, minterm solver 818 may be utilized to evaluate a minterm expression to solve for the values of each attribute referenced within the minterm such that the minterm evaluates to true or to false. These values may also be accessible through a reverse policy index. Maxterm solver 819 may also be provided to evaluate a maxterm expression to solve for the values of each attribute dereferenced within the maxterm such that the maxterm is evaluated. These values may also be accessible through a reverse policy index.

Policy rule solver 820 may be used to evaluate one or more rules, including a single policy rule. Policy rule solver 820 may solve for the values of attributes referenced within a policy rule such that the criteria associated with the analysis are satisfied. In an embodiment, a "criteria" may be a goal, an asserted value, a constraint, or any other appropriate value.

Number of policies solver 822 may be used to evaluate a number of policies. Number of policies solver 822 may solve for the values or values of an attribute or attributes referenced within number of policies 808 such that number of solution goals 836 is achieved and other elements of number of analysis criteria 806 are satisfied.

Number of solution goals 836 may be one or more policy elements for which values are sought to satisfy one or more analysis goals, questions, or queries posed to policy analyzer 800. In one non-limiting advantageous embodiment, a user may select one or more policy elements for analysis. In one example, a user may select a policy element for which the user seeks a value.

In this example, goal seek attribute value 838 may be the value of an attribute sought by a user that satisfies a set of criteria. In another non-limiting advantageous embodiment, number of solution goals 836 may also optionally specify goal seek role value 840. Goal seek role value 840 may be the value of a role for which the user seeks a value. Other goal seek types, such as goal seek policy element value(s) 843, may optionally be embodied, such as, but not limited to, result value and action value.

Number of analysis criteria 806 may also optionally include number of asserted policy element value(s) 824. Number of asserted policy element value(s) 824 may include no user-specified policy element values. Number of asserted policy element value(s) 824 may include one or more user-specified policy element values. Other policy element values, such as asserted policy element value(s) 833, may optionally be embodied, such as, but not limited to, asserted result value(s) 832 and asserted action value(s) 830.

Values may be asserted directly using a number of techniques. In an advantageous embodiment, values may be asserted directly using the user interface or by selecting an existing analysis. In another advantageous embodiment, values may be asserted directly by using a test suite that will be used as a basis for an analysis. A test suite is a set of attribute-value combinations, which, in some cases, may be developed in a prior session or by another user. That is, the user need not specify the value of each attribute independently, but may select an existing analysis or test suite that already specifies values for multiple attributes.

A policy element is an element within a policy in number of policies 808. More generally, a policy element, such as policy element 308, may be a rule, an action, an authorization decision, a subject attribute, a resource attribute, a relationship between an attribute and some other value, or possibly other aspects of a policy, such as policy 304 of FIG. 3.

An asserted value may be a value that is asserted or entered by a user. The user may enter a user-defined value for an attribute, a role, or any other policy element having a value. The user-defined value is then used by policy analyzer 800 to perform the analysis on number of policies 808.

Number of asserted policy element value(s) 824 may optionally include, without limitation, one or more asserted attribute value(s) 826. Asserted attribute value(s) 826 may be values of any attributes a user wishes to temporarily assert as part of an analysis. Asserted attribute value(s) 826 may be one value for one attribute. In another advantageous embodiment, asserted attribute value(s) 826 may be two or more asserted values for one attribute. Likewise, in still another advantageous embodiment, asserted attribute value(s) 826 may also include two or more values asserted for two or more attributes.

Number of asserted policy element value(s) 824 may also optionally include, for example, without limitation, one or more asserted role value(s) 828. Asserted role value(s) 828 may be values of any roles a user wishes to temporarily assert as part of an analysis. Asserted role value(s) 828 may be one value asserted by a user for one role. In another advantageous embodiment, asserted role value(s) 828 may be two or more values asserted by a user for two or more roles.

In a non-limiting advantageous embodiment, the user may specify how an asserted value in number of user asserted policy element value(s) 824 is used during a policy analysis. For example, without limitation, a user may specify that a user-defined value for an attribute be used for all instances of that attribute within number of policies 808.

In yet another non-limiting advantageous embodiment, guided policy analysis component 802 may order the solicitation or prompting of user-defined values such that the user input information gain is maximized. For example, without limitation, guided policy analysis component 802 may prompt a user to enter a user-defined value for the most frequently-used attribute values. In other words, guided policy analysis component 802 acquires the most frequently-used attribute values first.

In another non-limiting example, guided policy analysis component 802 may prompt the user to enter only those criteria or other information needed by policy analyzer 800 to perform the analysis solicited from the user. Thus, the user, in this advantageous embodiment, provides the minimal information to complete the analysis.

In yet another advantageous embodiment, guided policy analysis component 802 may suggest attributes to be constrained by the user. Guided policy analysis component 802 may suggest an attribute to be constrained if the attribute exceeds a threshold level of possible attribute value configurations. Alternatively, contribution of the attribute causes a threshold value of the attribute value configurations to be exceeded.

Number of analysis criteria 806 may also optionally include desired action 830. Desired action 830 may be an action that the user wants to occur. Desired action 830 may be any type of action, such as, without limitation, permitting access to a resource, denying access to a resource, downloading a document, opening a door, or any other suitable type of action.

Number of analysis criteria 806 may also optionally include desired result value 832. Desired result value 832 may be a result value of the policy analysis that the user wants to obtain.

Number of analysis criteria 806 may also optionally include an identification of policy element 834. Policy element 834 may be a user-selected policy element for analysis by policy analyzer 800. For example, without limitation, policy element 834 may identify one or more attributes and/or roles referenced by number of policies 808 that the user has selected to be analyzed by policy analyzer 800. A user may select policy element 834 to be included or excluded in order to further constrain the search and avoid computational explosion.

In one non-limiting advantageous embodiment, the user may select an attribute, role, or any other policy element having a value for a value determination. A value determination refers to policy analyzer 800 analyzing a policy to determine the value of the attribute, role, or other policy element.

In this advantageous embodiment, data, such as, without limitation, number of analysis criteria 806, number of policies 808, number of solution goals 836, number of asserted policy element value(s) 824, desired action 830, desired result value 832, policy element 834, policy analysis methods 814, or any other type of data may be embodied as a computer readable storage medium storing the corresponding data. The computer readable storage medium may be a storage medium, such as computer readable storage media 224 in FIG. 2.

The illustration of policy analyzer 800 in FIG. 8 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

FIG. 9 is an illustration of a table of goals for a policy analysis system in accordance with an advantageous embodiment. Goal 114 of FIG. 1 may be one example of goals 900. Goals 900 may also be number of solution goals 836 of FIG. 8. Like terms in FIG. 9 with respect to FIGS. 1-8 may be similar to each other or the same as each other. The various goals 900 shown in FIG. 9 may be examples of questions described above with respect to FIG. 1.

Goals 900 may include analysis criteria that identify a query, question, or goal to limit the scope of an analysis on number of policies 902. Goals 900 may be applied to any type of policy, such as, without limitation, set of policies 102 in FIG. 1, set of policies 300 in FIG. 3, and/or plurality of policies 810 in FIG. 8. Goals 900 may include sub goals, each of which may have a structure similar to or different than goals 900.

Goal 904 may specify a number of actions that are allowed by number of policies 902. The term "allow" refers to actively permitting or failing to deny. Goal 904 may be used by a policy analyzer to determine what actions are allowed by number of policies 902 given a set of asserted values, if any. Asserted values may or may not be specified by the user or some other analysis. For example, without limitation, goal 904 may require that a policy analyzer determine whether number of policies 902 authorizes user A to perform an action B on a resource C. In an advantageous embodiment, this determination may be made whether or not any policies authorize the action, whether specific policies authorize the action, or whether the action is authorized given a set of asserted values.

The number of actions may refer to one or more actions. An action may be any type of action controlled or referenced by a given policy. An action may be an action hierarchy, meaning that an action may be composed of other, more atomic, actions. For example, an action, such as "action: read+write" may be expressed as "action: read+action: write". For example, without limitation, number of policies 902 may include an access control policy that controls which users have read and write access to a file. In this illustrative example, the number of actions that is allowed by the number of policies may include at least one of read-only access, read and write access, and write-only access.

Goal 906 may be expressed as a query to identify a number of actions that are denied by number of policies 902. In other words, goal 906 may be expressed as a user-defined query asking what actions are denied by number of policies 902. For example, without limitation, goal 906 may specify that a policy analysis identify one or more users that are denied read access to a particular text file.

Goal 904 may optionally include goal 908 to identify conditions under which a number of actions are allowed by one or more policies in number of policies 902. Goal 908 may request the policy analyzer to solve for those conditions under which number of policies 902 allows one or more actions.

Goal 910 may be used to identify conditions under which a number of actions are denied by one or more policies in number of policies 902. In one illustrative example, goal 910 may be used to determine which roles and/or attribute values cause the number of policies 902 to deny one or more actions.

Goal 912 may be used to identify conditions which produce a desired result. In other words, goal 912 may be expressed as a query to solve for conditions under which number of policies 902 yields a desired output. For example, without limitation, goal 912 may identify attribute values that allow one or more desired actions.

Goal 914 may be expressed as a query to identify conditions which produce an undesired result. For example, without limitation, goal 914 may be used to request an identification of attribute values that allows one or more undesired actions.

Goal 916 may be expressed as a query to identify conditions which produce an indeterminate result. An indeterminate result refers to a conflicting or indeterminate outcome of a policy analysis. For example, without limitation, an indeterminate result may identify policies that are not applicable to the policy analysis, produce irrelevant results, or produce conflicting results.

Goal 918 may be used to identify modifications in number of policies 902 that change a result. In other words, goal 918 may be a query to the policy analyzer to identify changes to number of policies 902 that produce an output different from than obtained before the modification or changes were made to the number of policies 902. Goal 918 may be used to identify changes in number of policies 902 that affect a policy output. In one illustrative example, the modifications in number of policies 902 may be modifications that change the output to a desired output.

In one illustrative example, goal 918 may also be used to identify one or more policies in number of policies 902 that cannot be changed without changing a given result. For example, without limitation, goal 918 may be used to identify a policy or policy rule that alters the outputs of number of policies 902 when that policy or policy rule is changed.

Goal 920 may be used to identify changes that do not affect the result. In other words, goal 920 may be used to identify modification in one or more policies in number of policies 902 that produces the same output that was obtained before the modification or changes were made to number of policies 902.

Goal 922 may be expressed as a query to identify indeterminate results. An indeterminate result is any conflicting, uncertain, or inapplicable result.

Goal 924 may be used to identify a policy that allows a given action. The given action may be a single action and/or two or more actions. Processing of goal 924 may result in identification of a single policy that allows a given action, as well as two or more policies that allow the action.

Goal 926 may be expressed as a query to identify a policy in number of policies 902 that denies a given action. In other words, goal 926 may be used to identify one or more policies in number of policies 902 that does not allow one or more actions.

Goal 928 may be expressed as a query to identify the impact of changes in an operational environment. The policy analyzer may determine how changes in the operational environment or operational conditions changed a result or will change a result. Goal 928 may be used to identify what changes in the operational environment will result in a desired result.

Goal 930 may be expressed as a query to identify the impact of changes in the solution requirements. The solution requirements may specify validation conditions and other requirements that the number of policies 902 must satisfy. Goal 930 may be expressed as a query to determine which policies in number of policies 902 are affected by changes in the solution requirements, and to classify the extent to which these policies are affected. Goal 930 may also be used to determine how changes in solution requirements change the results of an existing policy analysis. For example, without limitation, goal 930 may include the specification of an to identify the policies affected by a change in the conditions under which a user may access a particular file and to determine which parts of an existing analysis are not affected by this change.

Goal 932 may be expressed as a query to identify the impact of changes in a domain model. The domain model includes the definitions of attributes, roles, and other policy elements. Goal 932 may be expressed as a query to identify how changes in the problem domain affect existing policies and/or the outputs those policies produce. In another illustrative example, goal 932 may be used to query a policy analyzer to identify which domain model elements or domain requirements may be changed without affecting a given output. Goal 932 may also be used to determine what changes in the definition of a domain or domain requirements produce a desired output.

Goal 934 may be expressed as a query to identify the impact of changes in the number of policies. For example, goal 934 may be expressed as a query to the policy analyzer to determine how changes in number of policies 902 affect a result. Goal 934 may also be expressed as a query to the policy analyzer to identify the one or more policies in number of policies 902 that can be changed without affecting the result. Goal 934 may also be expressed as a query to the policy analyzer for changes to number of policies 902 that may produce unintended side effects or indeterminate outputs.

In one advantageous embodiment, a policy analyzer, such as policy analyzer 800 in FIG. 8, may utilize a single goal shown in FIG. 9 to constrain an analysis on number of policies 902. For example, a user may select goal 904 for the policy analyzer to identify actions that are allowed by number of policies 902.

In another advantageous embodiment, a policy analyzer may utilize two or more goals shown in FIG. 9 in combination to constrain an analysis of number of policies 902. For example, without limitation, a user may select goal 920 for processing in order to identify actions that may be denied by number of policies 902, under which conditions a particular action is denied, and what attribute values deny the action.

In this advantageous embodiment, data, such as, without limitation, goals 900 may be embodied as a computer readable storage medium storing the corresponding data. The computer readable storage medium may be a storage medium, such as computer readable storage media 224 in FIG. 2.

The illustration of goals 900 in FIG. 9 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, goals 900 described in FIG. 9 are only examples of possible goals or questions that may be utilized in accordance with an advantageous embodiment. The advantageous embodiments may be implemented with goals not described or shown in FIG. 9.

FIG. 10 is an illustration of a policy index in accordance with an advantageous embodiment. Policy index 1000 may be a sparse table representing data used to create a reverse policy index for a number of policy rules, such as reverse policy index 702 in FIG. 7 and reverse policy index 1100 in FIG. 11. Policy index 1000 may be an intermediate step in the construction of reverse policy index 1100. Policy index 1000 may be the result of converting or transforming one or more policy rules from an "as authored" form into a form composed solely of minterms. However, the advantageous embodiments are not limited to forms composed solely of minterms.

Rule column 1002 contains an identifier for each policy rule indexed within policy index 1000. The identifier for each rule in rule column 1002 may be used to show a context for each minterm indexed in policy index 1000.

In this illustrative example, rule column 1002 contains a unique identifier for rule 1 1004 (R1), rule 2 1006 (R2), and rule 5 1008 (R5). However, the advantageous embodiments are not limited to implementation of policy indexes having only three indexed policy rules. Policy index 1000 may include an index for only a single policy rule, two policy rules, and/or four or more policy rules.

Minterm identifier column 1010 contains an assignment of a unique identifier to each minterm. For example, rule 1 1004 has a single minterm identifier (m1) in minterm identifier column 1010.

In this illustrative example, a policy analyzer may create a unique minterm identifier for each minterm of a rule as the "as authored" form of the policy rule is converted to the conjunctive normal form or minterm equivalent expression of the rule. A policy analyzer may use policy index 1000 to filter and sort minterms based on any combination of the indexed elements of a minterm. The policy analyzer in this illustrative example may utilize the columns of policy index 1000 to filter, sort, prune, or retrieve information needed to perform a policy analysis when only partial information is known about a policy or the state of a policy analysis.

Identifier column 1012 includes minterm expression identifiers for each policy rule indexed within policy index 1000. In this illustrative example, the identifier is the relative position of an expression within a minterm. The IDx identifier at identifier column 1012 may be concatenated with the corresponding minterm identifier to generate a unique identifier for the expression, such as "m1.1" for minterm expression entry 1016 or "m5.1" for minterm expression entry 1018.

However, in another illustrative example, the identifier may be generated using any other method for generating an identifier. For example, without limitation, the identifier may be an arbitrary identifier, such as a unique integer.

In this illustrative example, rule 1 1004 has only one minterm identified in identifier column 1012. However, rule 5 1008 has expression 1, expression 2, and expression 3 identified in identifier column 1012. Although this advantageous embodiment only illustrates minterms having a single expression or three expressions, policy index 1000 may include any number of expressions associated with a minterm.

Minterm expression column 1014 contains the specification of each Boolean expression within each minterm. Minterm expression column 1014 may include an identification of the roles and attributes referenced within each minterm. For example, without limitation, minterm expression entry 1016 and minterm expression entry 1018 constrain a value for a role. Minterm expression entry 1026 identifies the attribute "Resource_Marking".

Minterm expression column 1014 may include entries constraining the literal values and literal value sets referenced in a minterm. For example, without limitation, minterm expression entry 1020 and minterm expression entry 1024 constrain or identify the attribute "Subject_Relationship" to the value "employee". Minterm expression entry 1022 constrains or identifies the attribute "Resource_Marking" to the value "proprietary".

Minterm expression column 1014 may include entries identifying the type of operator referenced. For example, without limitation, minterm expression entries may identify operators, such as, equal, contains, does not contain, greater than, less than, intersects, and many others.

Expense column 1032 includes entries identifying a measure of the cost of solving the expression. In other words, expense column 1032 identifies the relative computing cost associated with solving an expression. In this illustrative example, the value in expense column 1032 cost is directly proportional to the number of attribute values for the referenced attribute that will yield a true value for the expression. For the illustrative example, the "E value" for row R1 is '15' because the role attribute has 16 defined values, of which 15 will yield a true result when used in the minterm expression 1016.

Number column 1034 contains entries identifying the number of expressions in each minterm. Negated operator column 1036 contains a number indicating the number of minterm expressions in a minterm which involve a negated operator, such as "does not contain" or "not equal". Expressions containing negated operators may be computationally expensive to solve, particularly if the permissible set of values for an attribute is large.

Action column 1038 contains entries that identify the action of the policy rule in which the minterm occurs. An action may be, without limitation, a read action, a write action, or a delete action. The number in parentheses may be an identifier for the named action.

Result column 1040 contains entries that identify a result type of the policy rule in which the minterm occurs. The result type indicates whether the action in action column 1038 associated with a minterm is allowed or denied when the minterm evaluates to true. If the minterm evaluates to false, no determination can be made about whether the action is allowed or denied. In this illustrative example, the result column entry for rule 1 1004 indicates that the read action will be denied whenever minterm expression entry 1016 evaluates to true. The result column entry for rule 2 1006 contains an entry that indicates that the read action will be allowed if the conjunction of minterm expression entries 1018, 1020, and 1022 evaluates to true.

Result column 1040 also contains entries that identify the relative precedence of each result. For example, without limitation, an authorization policy may either allow or deny an action. However, user-defined result values in addition to "allow" and "deny" may also be specified for other types of policies. Other result types could also be used.

Allowing an action refers to permitting the action to occur. Denying an action refers to preventing the action from occurring. In some situations, only one outcome is permitted. The result of evaluating a number of policies can either be an allow result or a deny result. If the conditions of both an allow result and a deny result are satisfied, the result with the highest precedence is the end result of the policy evaluation.

In this illustrative example, the precedence is indicated by a positive value from zero (0) to infinity. The precedence value of zero (0) is the highest precedence.

In this illustrative example, the deny result for rule 1 1004 is a deny result with a zero (0) precedence value. Both rule 2 1006 and rule 5 1008 have allow results with a precedence value of one (1). In this situation, the deny result for rule 1 1004 has precedence. Therefore, the deny result is the end result of the policy evaluation if minterms m1 and m9 evaluate to true. Minterms m1 and m5 cannot both evaluate to true at the same time, since minterm expression entries 1016 and 1018 are negations of one another.

Domain column 1042 contains entries that identify the policy domain associated with each minterm and the relative evaluation precedence of the policies specified within each domain. In a manner similar to result value precedence, the output associated with a minterm with a higher precedence takes precedence over the output of a minterm with a lower precedence. That is, if the conditions of two minterms are satisfied and the outputs have opposite effect, the output stemming from the minterm defined in the domain with the higher precedence will be the end result of the evaluation. In this illustrative example, the domain value for rule 1 1004 is "core(0)". The "core" text indicates that this rule is defined in the "core" domain. The zero (0) value associated with this value indicates that rule 1 1004 has a precedence of zero (0), which, in an advantageous embodiment, may be the highest precedence possible.

In another illustrative example, policy rules in one domain may take precedence over policy rules in another domain. Domain column 1042 values may also represent the relative precedence of policies in multiple domains.

The illustration of policy index 1000 in FIG. 10 is not meant to imply physical or architectural limitations to the manner in which different advantageous embodiments may be implemented. Other components in addition to and/or in place of the ones illustrated may be used. Some components may be unnecessary in some advantageous embodiments. Also, the tabular cells, columns, and rows of this figure are presented to illustrate some functional components. One or more of these elements may be combined and/or divided into different blocks when implemented in different advantageous embodiments. A policy index in accordance with the advantageous embodiments may include additional information not shown in FIG. 10. Likewise, a policy index in another illustrative example may not include one or more of the indexed information shown in FIG. 10.

FIG. 11 is an illustration of a reverse policy index of minterms in accordance with an advantageous embodiment. Reverse policy index 1100 may be a sparse table representing data used to create a reverse policy index for a number of policy rules, such as reverse policy index 702 in FIG. 7. Reverse policy index 1100 may be constructed from data in policy index 1000 of FIG. 10.

Number column 1102 contains entries identifying the number of expressions within each indexed minterm. The entries in number column 1102 may be from a column in a policy index, such as number column 1034 in FIG. 10.

Rule column 1104 contains entries of identifiers for each policy rule indexed within reverse policy index 1100. Entries in rule column 1104 may be from a column in a policy index, such as rule column 1002 in FIG. 10.

Minterm identifier column 1106 contains entries that assign a unique identifier to each minterm in each policy rule indexed within reverse policy index 1100. Minterm identifier column 1106 may be from a column in a reverse policy index, such as minterm identifier column 1010 in FIG. 10.

Identifier column 1108 contains entries that identify each unique minterm expression of each minterm for each policy rule indexed within reverse policy index 1100. In this illustrative example, identifier column 1108 provides the relative position of each minterm expression within a minterm. Identifier column 1108 may be from a column in a policy index, such as identifier column 1012 in FIG. 10.

Roles and attributes column 1110 identifies the roles and attributes referenced within each minterm expression. Value column 1112 identifies the literal values and value sets referenced by a minterm expression. Operator 1114 contains entries that identify the operator referenced in each minterm expression. An operator may be, for example, without limitation, equals, contains, does not contain, intersects, does not intersect, greater than, less than, is contained by, or possibly many others.

Negated operator column 1116 contains entries that identify minterm expressions that involve negated operators, such as "does not contain" or "not equal". Expressions containing negated operators may be computationally expensive to solve, particularly if the permissible set of values for an attribute is large. Negative operator column 1116 may be a column in a policy index, such as negated operator column 1036 in FIG. 10.

Expense column 1118 includes entries assigning a measure of the cost of evaluating the minterm. Entries in expense column 1118 may indicate the relative difficulty of evaluating or solving a minterm expression. A policy analyzer may utilize the information in expense column 1118 to refine the order in which minterm expressions are evaluated for a particular policy analysis. Expense column 1118 may be a column in a policy index, such as expense column 1032 in FIG. 10.

Expense column 1118 may be replaced or augmented by other measures, such as those described above with respect to FIG. 1, to determine the order in which expressions within a minterm should be evaluated. Expense column 1118 may be replaced or augmented to determine the order in which set of minterms 506 in FIG. 5 should be processed in order to avoid computational explosion, or for other purposes.

Result column 1120 contains entries that identify the result type of the policy rule in which the minterm occurs, and the relative precedence of this result type. The result type indicates whether the corresponding action in action column 1122 is allowed or denied when the minterm evaluates to true. For minterm m6, the action in action column 1122 is denied, whereas the action in action column 1122 is allowed for minterm m2. Result column 1120 may be a column in a policy index, such as result column 1040 in FIG. 10.

Action column 1122 contains entries that identify the action that is permitted or denied by a policy rule based on the evaluation results of the minterm. Action column 1122 may be a column in a policy index, such as action column 1038 in FIG. 10.

Domain column 1124 contains entries that identify the policy domain and evaluation precedence associated with a minterm and minterm expression. As described previously, a minterm with a higher precedence has precedence over the result of a minterm with a lower precedence if the conditions of both are satisfied. In this illustrative example, the domain value for rule 1 is "core(0)". The zero (0) value indicates that rule 1 has the highest precedence and is evaluated prior to other policy rules. Domain column 1124 may also include a value representing the relative precedence of policies in multiple domains. Domain column 1124 may be a column in a policy index, such as domain column 1042 in FIG. 10.

True solution column 1126 contains references to an evaluation method that may be used to efficiently evaluate or solve a minterm. In other words, each entry for a minterm may have a reference in true solution column 1126 to a method proven to successfully solve that type of minterm for attribute values which cause the minterm expression to evaluate to true.

Cached solution column 1128 contains references to the true or false cached solutions for each minterm expression if the solution has been determined for that expression. In other words, if a minterm expression has a cached solution, cached solution column 1128 may have a reference to the cached solution. Cached solution column 1128 may also contain the true or false solution values for the minterm as a whole if each of the minterm expression solutions has been determined.

The illustration of reverse policy index 1100 in FIG. 11 is not meant to imply physical or architectural limitations to the manner in which different advantageous embodiments may be implemented. Other components in addition and/or in place of the ones illustrated may be used. Some components may be unnecessary in some advantageous embodiments. Also, the tabular cells, columns, and rows of this figure are presented to illustrate some functional components. One or more of these elements may be combined and/or divided into different blocks when implemented in different advantageous embodiments.

Figure 12:
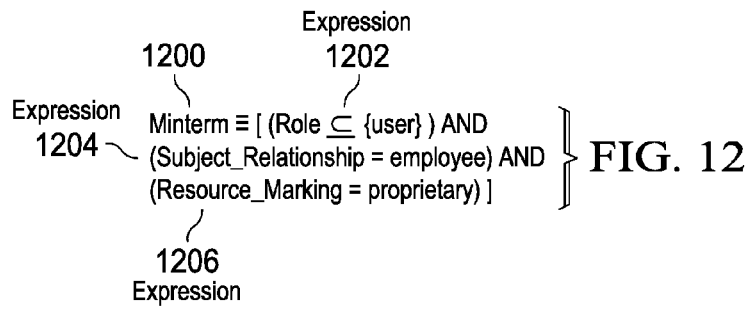
FIG. 12 is an illustration of pseudo code for a minterm in accordance with an advantageous embodiment.

FIG. 12 is an illustration of pseudo code for a minterm in accordance with an advantageous embodiment. Minterm 1200 is an example of a minterm associated with a policy rule, such as a minterm in set of minterms 506 in FIG. 5. Minterm 1200 may include one or more expressions, such as expression 1202, expression 1204, and expression 1206.

An advantageous embodiment of the present disclosure provides a policy analysis system. A guided policy analysis component obtains a number of analysis criteria associated with a number of policies. The number of analyses may include a number of goals for a policy analysis. A data storage device stores a number of cached policy element values associated with the policy analysis. A reverse policy index includes a location on the data storage device of each relevant policy element value in the number of cached policy element values. A policy analyzer retrieves the number of cached policy element values from the data storage device using the reverse policy index. The policy analyzer analyzes the number of policies with the user-defined criteria and the cached policy element values to form a policy analysis result.

Figure 13:
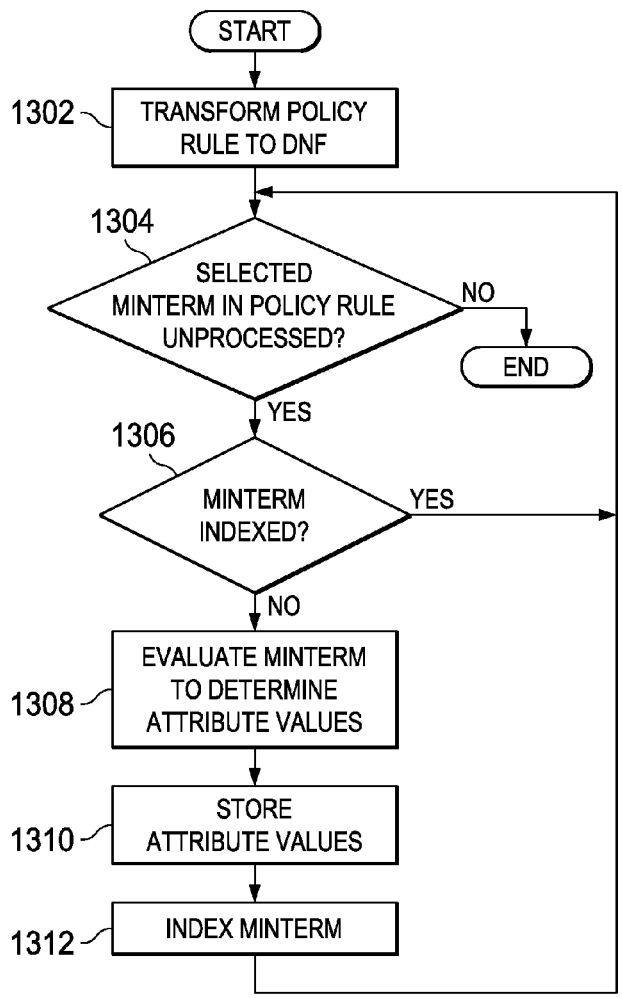
FIG. 13 is an illustration of a flowchart of a process for creating a reverse policy index in accordance with an advantageous embodiment.

FIG. 13 is an illustration of a flowchart of a process for creating a reverse policy index in accordance with an advantageous embodiment. The process in FIG. 13 may be implemented by a policy analyzer, such as policy analysis system 100 of FIG. 1, policy analysis system 400 of FIG. 4, policy analysis system 700 of FIG. 7, or policy analyzer 800 of FIG. 8. Uses for a reverse policy index are described with respect to FIG. 7 and FIG. 8. As used herein, the term "the process" may refer to a tangible object, such as, but not limited to, one or more processors.

The process begins by transforming a policy rule to disjunctive normal form (DNF) equivalent (operation 1302). A policy rule is a rule within a policy, such as set of policies 102 in FIG. 1 and policy rule 306 in FIG. 3. The process may store the transformed policy rule in a policy index, such as policy index 1000 of FIG. 10, to facilitate the construction of a reverse policy index, such as reverse policy index 1100 of FIG. 11.

A determination is made as to whether a selected minterm in the disjunctive normal form equivalent of the policy rule is unprocessed (operation 1304). If yes, a determination is made as to whether the unprocessed minterm is indexed (operation 1306). The index refers to a reverse policy index for the policy associated with the rule that is transformed in operation 1302.

If the minterm is indexed in a reverse policy index, the process returns to operation 1304. If the minterm is not indexed in a reverse policy index, the minterm is evaluated to determine attribute values (operation 1308). The determined attribute values are values of one or more attributes in the minterm.

The attribute values are then stored (operation 1310). The attribute values may be stored in any data storage device. In one illustrative example, the attribute values are stored in a cache memory.

Next, the minterm is indexed (operation 1312). Indexing the minterm refers to creating an entry for the minterm in a reverse policy index associated with the policy rule.

The process then returns to operation 1304. If a minterm is unprocessed, the process executes operations 1304 through 1312 iteratively. Otherwise, the process terminates thereafter.

Figure 14:
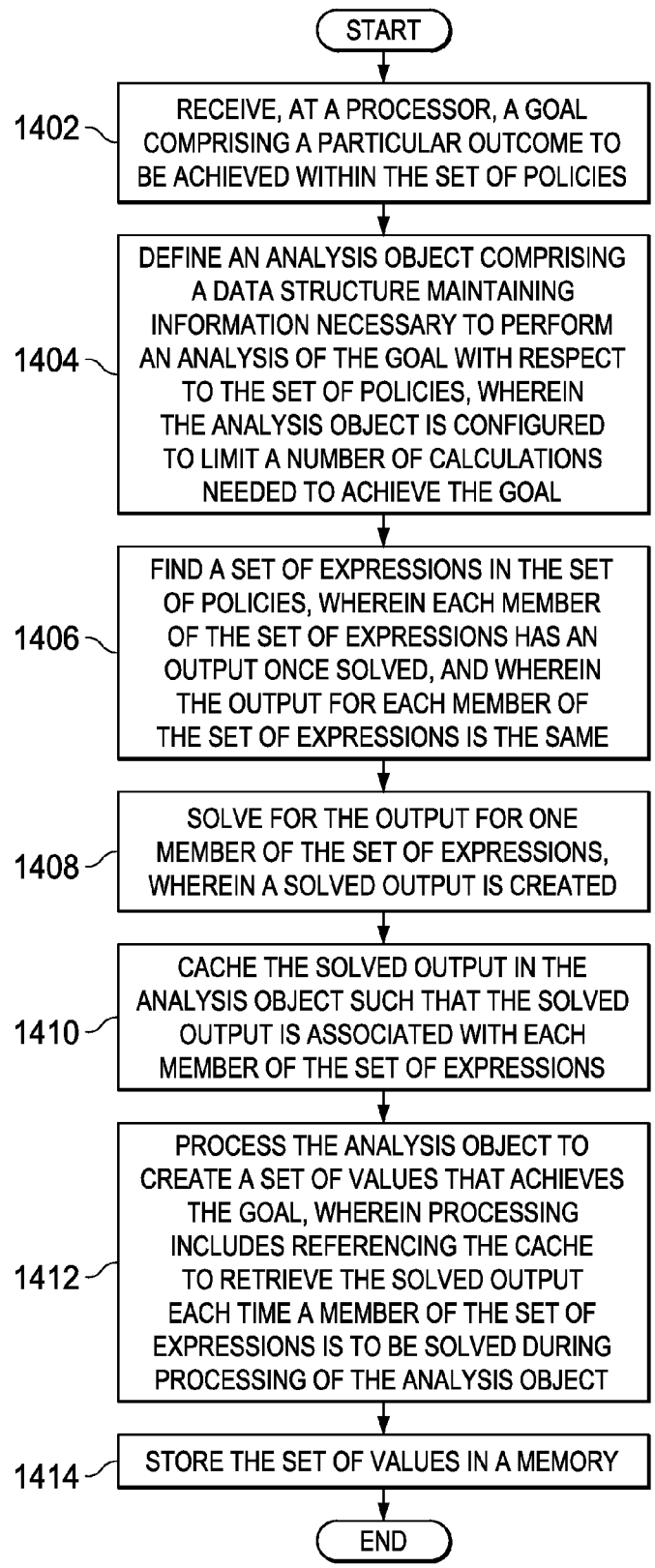
FIG. 14 is an illustration of a flowchart of a process for performing a policy analysis in accordance with an advantageous embodiment.

FIG. 14 is an illustration of a flowchart of a process for performing a policy analysis in accordance with an advantageous embodiment. The process illustrated in FIG. 14 may be implemented by a processor, such as those shown in FIG. 2, and may be implemented in a policy analysis system, such as policy analysis system 100 of FIG. 1. As used herein, the term "the process" may refer to a tangible object, such as, but not limited to, one or more processors.

The process begins by receiving, at a processor, a goal comprising a particular outcome to be achieved within the set of policies (operation 1402). Thereafter, the process defines an analysis object comprising a data structure maintaining information necessary to perform an analysis of the goal with respect to the set of policies, wherein the analysis object is configured to limit a number of calculations needed to achieve the goal (operation 1404).

The process then finds a set of expressions in the set of policies, wherein each member of the set of expressions has an output once solved, and wherein the output for each member of the set of expressions is the same (operation 1406). Thereafter, the process solves for the output for one member of the set of expressions, wherein a solved output is created (operation 1408). Next, the process caches the solved output in the analysis object such that the solved output is associated with each member of the set of expressions (operation 1410).

The process then processes the analysis object to create a set of values that achieves the goal, wherein processing includes referencing the cache to retrieve the solved output each time a member of the set of expressions is to be solved during processing of the analysis object (operation 1412). The process then stores the set of values in a memory (operation 1414). The process terminates thereafter.

In view of the preceding figures, an advantageous embodiment of the present disclosure provides a method for analyzing a set of policies. Goals and criteria may be received at a processor, the goal comprising a particular outcome to be achieved within the set of policies. An analysis object is defined, the analysis object comprising a data structure maintaining information necessary to perform an analysis of the goal with respect to the set of policies. The analysis object is configured to limit a number of calculations needed to achieve the goal. A set of expressions is found in the set of policies. Each member of the set of expressions has an output once solved. The output for each member of the set of expressions is the same. The output for one member of the set of expressions is solved, wherein a solved output is created. The solved output is cached in the analysis object such that the solved output is associated with each member of the set of expressions. The analysis object is processed to create a set of values that achieves the goal. Processing includes referencing the cache to retrieve the solved output each time a member of the set of expressions is to be solved during processing of the analysis object. The set of values is stored.

Thus, the advantageous embodiments provide a policy analyzer that aids a user in authoring, understanding, analyzing, modifying, and correcting policies. The policy analyzer in one advantageous embodiment applies user-defined criteria to control execution of a policy analysis. The criteria limit the scope of a policy analysis to a tractable and manageable policy analysis problem.

The policy analyzer of an advantageous embodiment assists the user in efficiently analyzing a number of policies to answer questions about policies. The policy analyzer guides the user in selecting goals or questions to be answered about those policies, such as, for example, without limitation, conditions under which desired results may be achieved, the relative importance of policy attributes, and the similarity of policies.

The advantageous embodiments provide a policy analyzer that enables a user to develop an in-depth understanding of complex policies. The advantageous embodiments also enable a user to author policies which produce a desired result with fewer unintended side effects.

The advantageous embodiments provide a guided policy analysis component that assists a user in conducting "what-if" hypothetical studies and experiments on a number of policies. The advantageous embodiments also assist a user in resolving common problems associated with creating policies.

As used herein, the phrase "at least one of", when used with a list of items, means that different combinations of one or more of the listed items may be used and only one of each item in the list may be needed. For example, "at least one of item A, item B, and item C" may include, for example, without limitation, item A. In another example, this term may refer to item A and item B. This example also may include item A, item B, and item C, or item B and item C.

As used herein the term "set" may refer to one or more items. Thus, a "set of values" may refer to one or more values. Likewise, a "set of actions" may refer to one or more actions. Similarly, a "set of policies" may refer to one or more policies. Other examples are described herein.

The flowcharts and block diagrams in the figures illustrate the architecture, functionality, and operation of possible implementations of systems, methods, and computer program products according to various advantageous embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The different advantageous embodiments can take the form of an entirely hardware embodiment, an entirely software embodiment, or an embodiment containing both hardware and software elements. Some advantageous embodiments are implemented in software, which includes, but is not limited to, forms, such as, for example, firmware, resident software, and microcode.

Furthermore, the different advantageous embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Illustrative examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Illustrative examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for analyzing a set of policies, the method comprising:
   receiving, at a processor unit, a goal comprising a particular outcome to be achieved within the set of policies;
   defining an analysis object comprising a data structure maintaining information necessary to perform an analysis of the goal with respect to the set of policies, wherein the analysis object is configured to limit a number of calculations needed to achieve the goal;
   finding a set of expressions in the set of policies, wherein each member of the set of expressions has an output once solved, and wherein the output for the each member of the set of expressions is the same;
   solving for the output for one member of the set of expressions, wherein a solved output is created;
   caching the solved output in a cache of the analysis object such that the solved output is associated with the each member of the set of expressions; and
   processing the analysis object to create a set of values that achieves the goal, wherein processing includes referencing the cache to retrieve the solved output each time a member of the set of expressions is to be solved during processing of the analysis object.

2. The method of claim 1 further comprising:
solving a conditional logic of a new policy responsive to authoring the new policy or changing an existing policy.

3. The method of claim 1, wherein the analysis object is configured to limit the number of calculations by eliminating one or more of the following from the analysis object: a policy, a policy element, a policy rule, a policy attribute, and a policy attribute value irrelevant to the goal.

4. The method of claim 1, wherein the analysis object is a first analysis object, and further comprising:
taking an action selected from the group consisting of: changing a policy, adding a policy, and deleting a policy, wherein a second analysis object is formed;
identifying differences between the first analysis object and the second analysis object; and
relating the differences to changes in one or more policies associated with both the first analysis object and the second analysis object.

5. The method of claim 1 further comprising:
expressing one or more conditions in the set of policies as a set of disjunctive normal form expressions, wherein the set of disjunctive normal form expressions comprises a set of minterms; and
computing a set of values that cause the set of minterms to have a particular outcome.

6. The method of claim 5 further comprising:
ranking the set of minterms in a particular order to be evaluated or solved; and
processing the set of minterms in a particular order.

7. The method of claim 5 further comprising:
avoiding processing of a policy attribute value in the set of policies and avoiding processing of additional sets of policies.

8. The method of claim 1 further comprising:
expressing one or more conditions in the set of policies as a set of conjunctive normal form expressions, wherein the set of conjunctive normal form expressions comprises a set of maxterms;
factoring out repeated or irrelevant pieces of rule logic from the set of policies using the set of conjunctive normal form expressions; and
computing a set of values that cause the set of conjunctive normal form expressions to have a particular outcome.

9. The method of claim 8 further comprising:
ranking the set of maxterms in a particular order to be evaluated or solved; and
processing the set of maxterms in the particular order.

10. The method of claim 1, wherein the set of values are selected from the group consisting of: groups of policy sets, a policy identification, a rule, a minterm, an expression, an attribute, an operator, a value, an action value, and a result value.

11. The method of claim 1 further comprising:
identifying values of attributes that need to have values to fulfill the goal.

12. The method of claim 1, wherein the analysis object is configured by receiving and storing values that may be constant when performing the processing of the analysis object.

13. The method of claim 1 further comprising:
decomposing the analysis object into a plurality of smaller analysis objects; and
individually processing the plurality of smaller analysis objects.

14. The method of claim 1 further comprising:
using a precedence for a plurality of policies in the set of policies to guide processing of the analysis object.

15. The method of claim 1 further comprising:
using a reverse policy index to provide previously computed elements to the analysis object during processing.

16. The method of claim 15 further comprising:
using the reverse policy index to look up intermediate results needed to enable higher-level analysis results.

17. A computer program product for analyzing a set of policies, the computer program product comprising:
a computer readable storage medium;
program code, stored on the computer readable storage medium, for receiving a goal comprising a particular outcome to be achieved within the set of policies;
program code, stored on the computer readable storage medium, for defining an analysis object comprising a data structure maintaining information necessary to perform an analysis of the goal with respect to the set of policies, wherein the analysis object is configured to limit a number of calculations needed to achieve the goal;
program code, stored on the computer readable storage medium, for finding a set of expressions in the set of policies, wherein each member of the set of expressions has an output once solved, and wherein the output for the each member of the set of expressions is the same;
program code, stored on the computer readable storage medium, for solving for the output for one member of the set of expressions, wherein a solved output is created;
program code, stored on the computer readable storage medium, for caching the solved output in the analysis object such that the solved output is associated with the each member of the set of expressions; and
program code, stored on the computer readable storage medium, for processing the analysis object to create a set of values that achieves the goal, wherein the processing includes referencing the cache to retrieve the solved output each time a member of the set of expressions is to be solved during the processing of the analysis object.

18. The computer program product of claim 17 further comprising:
program code, stored on the computer readable storage medium, for expressing one or more conditions in the set of policies as a set of disjunctive normal form expressions, wherein the set of disjunctive normal form expressions comprises a set of minterms; and
program code, stored on the computer readable storage medium, for computing a set of values that cause the set of minterms to have a particular outcome.

19. A data processing system comprising:
a bus;
a storage device connected to the bus, wherein program code is stored on the storage device; and
a processor unit connected to the bus, wherein the processor unit is configured to execute the program code to:
receive a goal comprising a particular outcome to be achieved within the set of policies;
define an analysis object comprising a data structure maintaining information necessary to perform an analysis of the goal with respect to the set of policies, wherein the analysis object is configured to limit a number of calculations needed to achieve the goal;
find a set of expressions in the set of policies, wherein each member of the set of expressions has an output once solved, and wherein the output for each member of the set of expressions is the same;

solve for the output for one member of the set of expressions, wherein a solved output is created;

cache the solved output in the analysis object such that the solved output is associated with each member of the set of expressions; and process the analysis object to create a set of values that achieves the goal, wherein processing includes referencing the cache to retrieve the solved output each time a member of the set of expressions is to be solved during processing of the analysis object.

20. The data processing system of claim 19, wherein the processor unit is further configured to execute the program code to:

express one or more conditions in the set of policies as a set of disjunctive normal form expressions, wherein the set of disjunctive normal form expressions comprises a set of minterms; and compute a set of values that cause the set of minterms to have a particular outcome.

\* \* \* \* \*